United States Patent
Nanda

(10) Patent No.: US 12,440,437 B2
(45) Date of Patent: *Oct. 14, 2025

(54) HYDROPHOBIC ORAL CARE COMPOSITIONS WITH HYDROPHOBIC HERBAL EXTRACT

(71) Applicant: GURUNANDA, LLC, Buena Park, CA (US)

(72) Inventor: Puneet Nanda, Beverly Hills, CA (US)

(73) Assignee: GURUNANDA, LLC, Buena Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/830,292

(22) Filed: Sep. 10, 2024

(65) Prior Publication Data

US 2025/0241846 A1 Jul. 31, 2025

Related U.S. Application Data

(63) Continuation of application No. 18/585,677, filed on Feb. 23, 2024.

(60) Provisional application No. 63/625,271, filed on Jan. 25, 2024.

(51) Int. Cl.
*A61K 8/9789* (2017.01)
*A61K 8/37* (2006.01)
*A61K 8/67* (2006.01)
*A61K 8/9794* (2017.01)

(52) U.S. Cl.
CPC .............. *A61K 8/9789* (2017.08); *A61K 8/37* (2013.01); *A61K 8/67* (2013.01); *A61K 8/678* (2013.01); *A61K 8/9794* (2017.08); *A61K 2236/37* (2013.01); *A61K 2800/30* (2013.01)

(58) Field of Classification Search
None
See application file for complete search history.

(56) References Cited

U.S. PATENT DOCUMENTS

| | | | |
|---|---|---|---|
| 2005/0196359 A1 | 9/2005 | D'Amelio, Sr. et al. | |
| 2013/0263395 A1 | 10/2013 | Boyd et al. | |
| 2014/0341820 A1* | 11/2014 | Maloney | A61K 8/375 424/54 |
| 2015/0359734 A1 | 12/2015 | Boland et al. | |
| 2019/0175956 A1* | 6/2019 | Dolezal | A61K 8/99 |
| 2021/0120859 A1 | 4/2021 | Boillot et al. | |
| 2021/0177738 A1* | 6/2021 | Keller | A61K 47/38 |
| 2023/0000739 A1 | 1/2023 | Hoss | |

FOREIGN PATENT DOCUMENTS

| | | | |
|---|---|---|---|
| CN | 1742752 | | 3/2006 |
| CN | 1842314 A | | 10/2006 |
| CN | 101077989 A | * | 11/2007 |
| CN | 115887345 A | | 4/2023 |
| RU | 2280435 C2 | | 7/2006 |
| RU | 2448711 C2 | | 4/2012 |

OTHER PUBLICATIONS

IOI Oleochemical, MIGLYOL 812 N Excipient Technical Data Sheet 2019, retrieved from URL>https://marcordev.com/wp-content/uploads/2019/08/MIGLYOL_812_N_Excipient_TDSH.pdf (Year: 2019).*
USPTO, Non-Final Office Action dated May 9, 2024 in U.S. Appl. No. 18/432,033.
Khan et al., Pharmacological Aspects of Traditional Plant Extracts in Maintaining Oral Health: A Narrative Review, Saudi J. Med Pharm Sci, 8(11): 653-659, 2022 (Year: 2022).
Rajogopalan, Herbal Prodcuts in Oral Hygiene Maintenance—A Review, IOSR Journal of Pharmacy, vol. 5, Issue 1 (Jan. 2015), pp. 48-51 (Year: 2015).
Machine Translation of CN115887345 (Year: 2023).
Machine Translation of CN 101077989 (Year: 2007).
Machine Translation of CN 1842314 (Year: 2006).
Machine Translation of RU2280435 (Year: 2006).
Machine Translation of RU2448711 (Year 2012).
IOI Oleochemical, MIGLYOL® 810 N Excipient Technical Data Sheet, https://marcordev.com/wp-content/uploads/2020/07/MIGLYOL_810_N_TDSH-1.pdf (Year: 2024); 4 pages.
MIGLYOL® 810—IOI Oleo—datasheet, https://web.archive.org/web/20171015021300/https://cosmetics.specialchem.com/product/i-ioi-oleo-miglyol-810 (Year: 2017); 5 pages.
Product Information MIGLYOL® 810, 812, 818, 829, 840 Neutral Oils . . . , https://www.yumpu.com/en/documen/view/6898004/product-information-miglyolr-810-812-818-829-840-neutral-oils- (Year: 2012); 5 pages.

* cited by examiner

Primary Examiner — Nannette Holloman
(74) Attorney, Agent, or Firm — Snell & Wilmer LLP

(57) ABSTRACT

A composition for oral care is provided having a medium chain triglyceride a hydrophobic anti-microbial agent, and a hydrophobic flavoring agent.

15 Claims, 7 Drawing Sheets

% Reduction in CFUs of Gram Positive Bacteria

|  | Mean % reduction in CFUs Gram Positive |
|---|---|
| Oil A | 23.16% |
| Aqueous Mouthwash | 19.68% |
| Placebo | 21.43% |

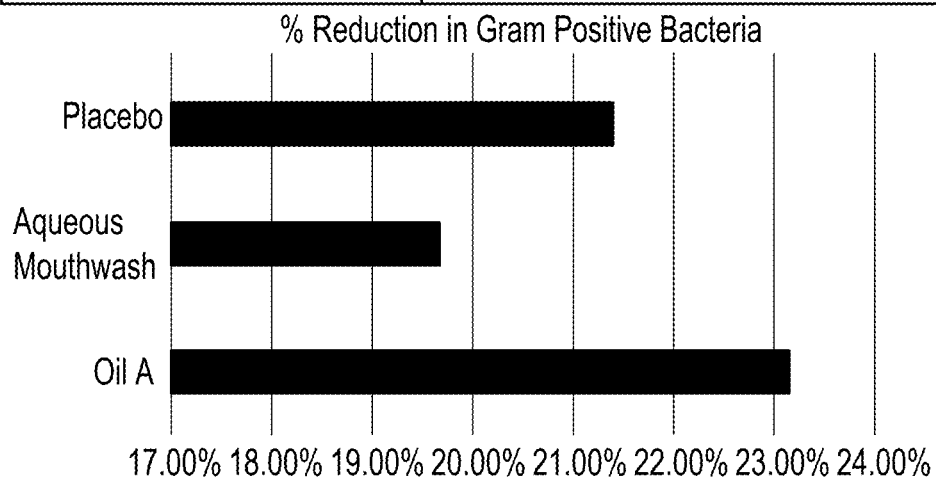

Gram Positives Identified: Streptococcus mutans, Enterococcus faecium, Streptococcus mitis & Streptococcus Sanguinis % Reduction in CFUs of Gram Negative Bacteria

|  | Mean % reduction in CFUs Gram Positive |
|---|---|
| Oil A | 24.90% |
| Aqueous Mouthwash | 19.43% |
| Placebo | 15.01% |

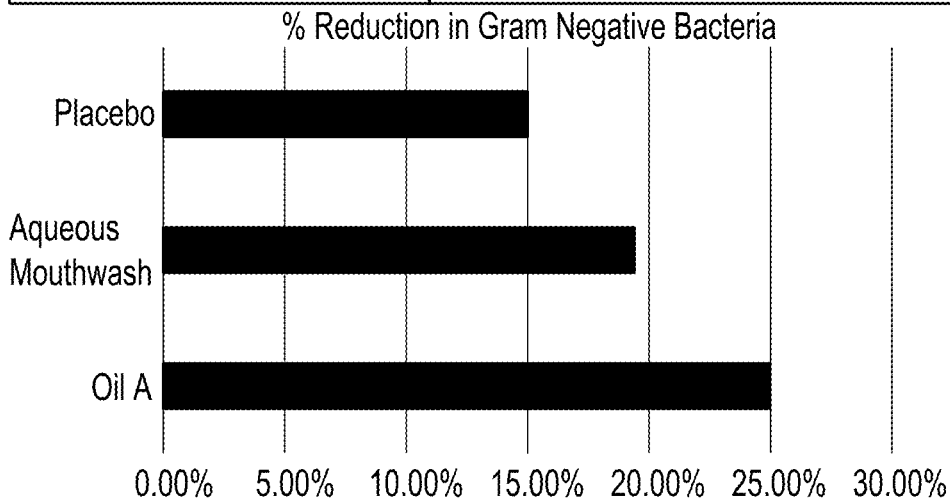

Gram Negatives Identified: E. coli, Klebsiella spp., & Pseudomonas aeruginosa

FIG.2

% Reduction in CFUs of Candida albicans

No observation was recorded due to inconsistent microbiological data in subjects with Candida albicans Mean % Reduction in Modified Gingival Score

|  | Mean % reduction from Baseline to EOT |
|---|---|
| Oil A | 2.67% |
| Aqueous Mouthwash | -1.42% |
| Placebo | -1.10% |

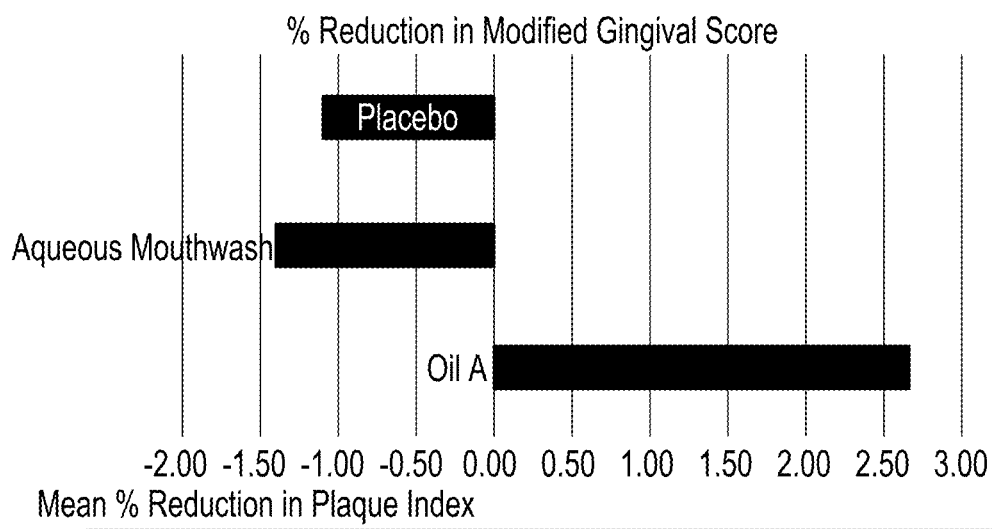

Mean % Reduction in Plaque Index

|  | Mean % reduction from Baseline to EOT |
|---|---|
| Oil A | 30.64% |
| Aqueous Mouthwash | 15.54% |
| Placebo | 2.69% |

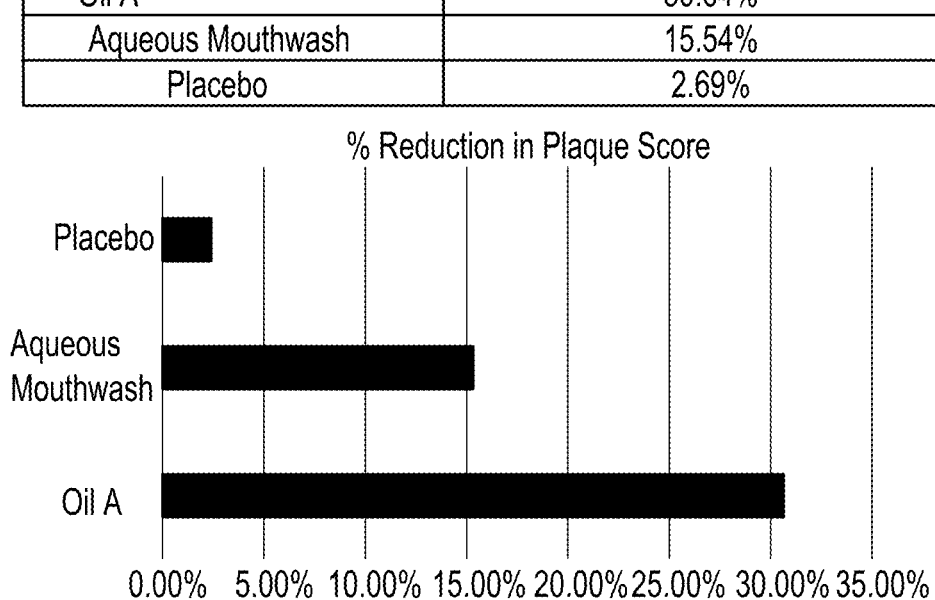

FIG.3

Study GN-2023-OM-01

Table 3 Organoleptic score difference from visit 1 (baseline) using repeated ANOVA model

| Visit | Mouthwash A | | | Mouthwash B | | | A - B difference | | |
|---|---|---|---|---|---|---|---|---|---|
| | n | mean | SD | n | mean | SD | Visit | Mean diff | p value |
| 2 | 29 | -0.425 | 0.577 | 31 | -0.892 | 0.567 | 2 | 0.467 | 0.0000 |
| 3 | 29 | -0.839 | 0.829 | 31 | 2.624 | 2.067 | 3 | 1.785 | 0.0000 |

Table 3. Significant reduction in organoleptic scores occurred in Group B after 12 hours and after 3 weeks (p <0.0)

FIG.6

| Subject Number | Sex | Race | Age | Oral Exam | Baseline Tooth #7 | Tooth #8 | Tooth #9 | Tooth #10 | 6-Week Visit Tooth #7 | Tooth #8 | Tooth #9 | Tooth #10 | Average Tooth Shade Change |
|---|---|---|---|---|---|---|---|---|---|---|---|---|---|
| 001 | Male | Black or African Am | 20 | Normal | D2 | B1 | A1 | B1 | A1 | B1 | B1 | B1 | 1 |
| 002 | Female | Asian | 20 | Normal | B1 | B1 | B1 | B1 | OM2 | OM2 | OM2 | OM2 | 2 |
| 003 | Female | Asian | 19 | Normal | A1 | B2 | B2 | A1 | B1 | B1 | B1 | B1 | 2 |
| 004 | Female | White | 68 | Normal | B2 | D2 | D2 | B2 | B1 | B1 | B1 | B1 | 3 |
| 005 | Male | Hispanic or Latino | 67 | Normal | C1 | A2 | A2 | C1 | B1 | A1 | A1 | B1 | 4 |
| 006 | Female | White | 45 | Normal | B1 | A1 | A1 | B1 | OM2 | OM2 | OM2 | OM2 | 3 |
| 007 | Male | White | 70 | Normal | C2 | D4 | D4 | C2 | D2 | D2 | D2 | D2 | 4 |
| 008 | Male | Black or African Am | 30 | Normal | B1 | B1 | B1 | B1 | OM2 | OM2 | OM2 | OM2 | 2 |
| 009 | Female | Black or African Am | 69 | Normal | D2 | A2 | A2 | D2 | B2 | B2 | A1 | B2 | 2 |
| 010 | Female | Asian | 57 | Normal | C1 | C1 | C1 | C1 | D2 | D2 | D2 | D2 | 2 |
| 011 | Male | Hispanic or Latino | 56 | Normal | D2 | D3 | D3 | D2 | D2 | D2 | D2 | B1 | 4 |
| 012 | Female | Hispanic or Latino | 20 | Normal | A1 | A1 | A1 | A1 | A1 | A1 | A1 | A1 | 3 |
| 013 | Female | Hispanic or Latino | 47 | Normal | B1 | B1 | B1 | B1 | OM1 | OM1 | OM1 | OM1 | 3 |
| 014 | Male | White | 65 | Normal | C3 | C3 | C3 | C3 | D3 | D3 | D3 | D3 | 4 |
| 015 | Female | Hispanic or Latino | 66 | Normal | D4 | D4 | D4 | D4 | D2 | D2 | D2 | D2 | 4 |
| 016 | Male | Hispanic or Latino | 42 | Normal | D2 | A1 | A1 | A1 | A1 | A1 | B1 | A1 | 1 |
| 017 | Male | White, middle east | 56 | Normal | D2 | D3 | D3 | D3 | B2 | B1 | D3 | B1 | 2 |
| 018 | Female | White, middle east | 62 | Normal | D3 | D2 | D2 | B2 | D4 | A3 | A3 | D4 | 1 |
| 019 | Male | Hispanic or Latino | 22 | Normal | A1 | A1 | B2 | C1 | A1 | A1 | A1 | A1 | 1 |
| 020 | Female | Hispanic or Latino | 50 | Normal | D3 | D2 | D2 | D2 | C1 | D2 | D2 | B1 | 2 |
| 021 | Female | Hispanic or Latino | 50 | Normal | B2 | B2 | B2 | B2 | B1 | A1 | A1 | A1 | 3 |
| 022 | Female | White | 39 | Normal | B2 | B1 | B1 | B1 | A1 | B1 | B1 | B1 | 2 |
| 023 | Male | Black or African Am | 20 | Normal | B1 | B1 | B1 | B1 | A1 | B1 | B1 | A1 | 2 |
| 024 | Male | Black or African Am | 19 | Normal | D2 | A2 | A2 | D2 | OM2 | OM2 | OM2 | OM2 | 2 |
| 025 | Female | Hispanic or Latino | 72 | Normal | B1 | B1 | B1 | A1 | OM1 | OM1 | OM1 | OM1 | 3 |
| 026 | Female | White | 30 | Normal | B1 | B1 | B1 | B1 | OM1 | OM1 | OM1 | OM1 | 3 |
| 027 | Female | Hispanic or Latino | 67 | Normal | B1 | B1 | B1 | B1 | OM1 | OM1 | OM1 | OM1 | 3 |
| 028 | Female | Hispanic or Latino | 69 | Normal | D2 | A2 | A2 | D2 | B1 | B1 | B1 | B1 | 4 |
| 029 | Male | Asian | 21 | Normal | A1 | A1 | B2 | A1 | OM2 | OM2 | OM2 | OM2 | 3 |
| 030 | Male | White | 47 | Normal | C2 | C2 | C2 | C2 | D2 | D2 | D2 | D2 | 3 |
| Average Tooth Shade | | | | | | | | | | | | | 2.6 |

FIG.7

HYDROPHOBIC ORAL CARE COMPOSITIONS WITH HYDROPHOBIC HERBAL EXTRACT

CROSS REFERENCE TO RELATED APPLICATIONS

This application is a continuation of co-pending U.S. patent application Ser. No. 18/585,677, filed Feb. 23, 2024, which claims the benefit of and priority to U.S. Provisional Application Ser. No. 63/625,271, titled "HYDROPHOBIC ORAL CARE COMPOSITIONS WITH HYDROPHOBIC HERBAL EXTRACT" and filed Jan. 25, 2024, the entire contents of each of which is hereby incorporated by reference in its entirety.

TECHNICAL FIELD

The present disclosure relates generally to a composition for oral care comprising various hydrophobic constituents.

BACKGROUND

Most compositions for oral care, including mouth washes, dentifrices, and oral sprays, are aqueous. Accordingly, the constituents in an aqueous oral care composition have difficulty penetrating the biofilm that lines the oral cavity and teeth. Hydrophobic compositions tend to be viscous, which may feel unpleasant to some consumers.

SUMMARY

In accordance with various aspects, a composition for oral care is provided having a medium chain triglyceride a hydrophobic anti-microbial agent, and a hydrophobic flavoring agent, a hydrophobic herbal extract, and a hydrophobic vitamin.

BRIEF DESCRIPTION OF THE DRAWING FIGURES

FIGS. 2 and 3 illustrate anti-microbial properties of an oral care composition according to various embodiments.

FIGS. 5 and 6 illustrate malodor reduction of anti-microbial properties of an oral care composition according to various embodiments.

FIG. 7 illustrates tooth whitening of an oral care composition according to various embodiments.

DETAILED DESCRIPTION

Definitions

Figure 1:
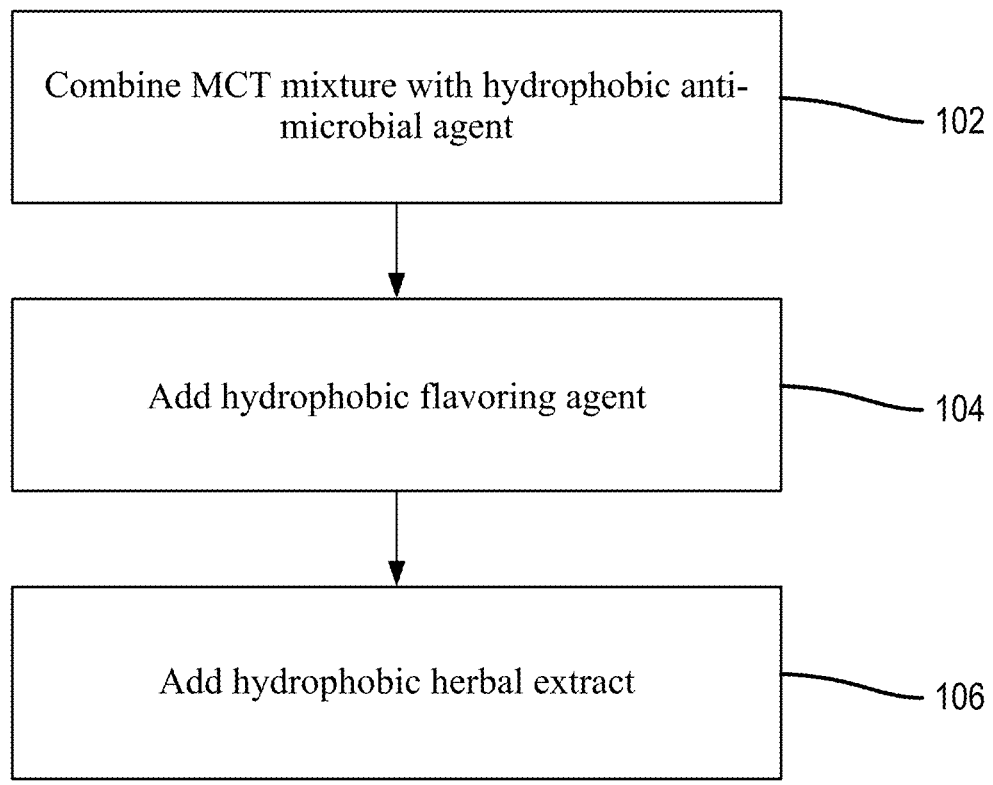
FIG. 1 is a graph illustrating a method of making an oral care composition according to various embodiments.

The following is a list of definitions for terms used herein. Unless defined otherwise, all technical and scientific terms used herein generally have the same meaning as commonly understood by one of ordinary skill in the art. In the event that there is a plurality of definitions for a term herein, those in this section prevail unless stated otherwise. Generally, the nomenclature used herein and the laboratory procedures in cytopathicity analysis, microbial analysis, organic, physical and inorganic chemistry, and dental clinical research are those well-known and commonly employed in the art.

As used herein, "about" will be understood by persons of ordinary skill in the art and will vary to some extent on the context in which it can be used. Generally, "about" encompasses a range of values that are plus/minus 10% of a reference value, unless specifically defined. For instance, "about 25%" encompasses values from 22.5% to 27.5%.

As used herein, "ambient conditions" means approximately room temperature (e.g., 20-35° C.) and relative humidity of approximately <70%.

As used herein, "a reasonable period of time" means the time, ranging from months to years, depending upon the application, a composition may be expected to maintain a safe and efficacious amount of its combined ingredients.

As used herein, "shelf-life stable" and "shelf-life stability" are used interchangeably and refer to the multi-component composition being deemed consumer acceptable after a defined period of time after its production (under ambient conditions).

As used herein, "bioavailability" means to the absorption or penetration of the active agent(s) of the composition into the organic matter to which it is exposed and/or the absorption rate proportion of the dose of the composition that reaches the systemic circulation of the organic matter for which its use is intend. For example, when a composition is administered intravenously, its bioavailability is nearly 100%, while when the composition is administered topically, a fraction of the total composition reaches systemic circulation. The term "bioavailability" also refers to its availability for efficacy at the desired site and for efficacy that either intracellular, extracellular or within biofluids/biological fluids.

As used herein, "biocidal", "bactericidal", "fungicidal" or synonymous terms means the property of inactivating or killing microorganisms, such as bacteria, algae, yeast, and fungi. As used herein, "biocidal" also refers to the effect of a composition as a treatment for reduction of bacterial or fungal or microbial growth or overgrowth in fluids or biofilm which may be associated with alleviating a diseased condition or state.

As used herein, "anti-microbial" means the property of inactivating or killing microorganisms, such as viruses, bacteria, algae, yeast, and fungi. As used herein, "biocidal" also refers to the effect of a composition as a treatment for reduction of bacterial or fungal or ither microbial growth or overgrowth in fluids or biofilm which may be associated with alleviating a diseased condition or state.

As used herein, "biostatic", "bacteriostatic", "fungistatic" or synonymous terms means the property of arresting the growth of microorganisms, such as bacteria, algae, yeast and fungi. As used herein, "biostatic" means to the effect of a composition in maintaining the polymicrobial mixture of a fluid or a biofilm, as in maintaining the oral ecology so that one or more organisms have not overgrown to enable inflection and disease. Compositions with biostatic attributes are useful in health maintenance, wellness and prevention of infection and disease.

As used herein, a "biofilm" means a biological aggregate that forms a layer on a surface, the aggregate comprising a community of microorganisms embedded in an extracellular matrix of polymers and/or other biocompounds such as glycoproteins. Typically, a biofilm comprises a diverse community of microorganisms, including bacteria (aerobic and anaerobic), algae, protozoa, yeast, and fungi. While mono-species biofilms also exist, biofilms in vivo become polymicrobial as they develop overtime creating oxygen-scare environments where anaerobic pathogens thrive and where the biofilm matrix protects the polymicrobial mixture within from antimicrobial treatment.

As used herein "a carrier" means those components of a composition that are capable of being commingled to provide required physical consistency and consumer goodness properties without interaction with other ingredients.

As used herein, "orally acceptable carrier" means a suitable vehicle or ingredient, which can be used to form and/or apply the present compositions to the oral cavity in a safe and effective manner.

As used herein, "compatible" means that the components of the composition are capable of being commingled without interaction in any manner which would substantially reduce the stability of the oral care composition, ingredients required for the efficacy, the carrier and excipients, and the consumer qualities of the composition.

As used herein, "consumer goodness qualities" include, but are not limited to, appearance, viscosity, taste, odor, abrasiveness, color, flavor, and moisturizing attributes of the compositions deemed desirable by consumers through consumer product testing or other such means. For example, it may be desirable that a tube of toothpaste produce a ribbon stripe of toothpaste on a toothbrush when squeezed and that the toothpaste composition is neither too firm to be squeezed easily from the tube nor too viscous so as not to hold or rest on the toothbrush ready or use.

As used herein, "dental plaque" means a polymicrobial biofilm that forms on the surface of teeth.

As used herein, "essentially free" means a composition which is comprised of very low levels, below detection levels of commonly used analytical methods, of a specific ingredient or compound or molecule.

As used herein, "vehicle" means an orally-acceptable dentifrice vehicle used to prepare a dentifrice composition comprising a water-phase, containing a humectant therein.

As used herein, "dentifrice" means paste, gel, powder, tablets, or liquid formulations, unless otherwise specified, that are used to clean the surfaces of the oral cavity.

As used herein, "teeth" refers to natural teeth as well as artificial teeth or dental prosthesis.

As used herein, "efficacious amount" means any amount of the agent that may result in a desired biocidal or biostatic or chemical or physiological effect, a desired cosmetic effect, and/or a desired therapeutic biological effect. In one example, an efficacious amount of an agent used for tooth whitening may be an amount that may result in whitening of a tooth with one or more treatments. In another example, an efficacious amount of an agent used for wound treatment is an amount that may result in a statistically significant improvement in wound healing.

As used herein, "film" means a layer of a material having two dimensions substantially larger than the third dimension. A film may be a liquid or a solid material. For some materials, a liquid film can be converted into a solid film by curing, for instance, by evaporation, heating, drying, cross-linking, adhering, adduct formation, and like phenomena.

As used herein, "hard tissue" means any toe and fingernail, hard keratinized tissue, hard tooth tissue, bone, tooth and the like, found in animals such as mammals.

As used herein, "essentially free of" means including unavoidable levels of a given material but no more.

As used herein, "substantially free of" means no more than 0.5% by weight of a given material.

As used herein, "irritating" and "irritation" refer to the property of causing a local inflammatory response, such as reddening, swelling, itching, burning, or blistering, by immediate, prolonged, or repeated contact. For example, inflammation of a non-oral mucosal or dermal tissue in a mammal can be an indication of irritation to that tissue. A composition may be deemed "substantially non-irritating" or "not substantially irritating," if the composition is judged to be slightly or not irritating using any standard method for assessing dermal or mucosal irritation.

As used herein, "pharmaceutically acceptable" is set forth broadly and refers without limitation to those compounds, materials, compositions and/or dosage forms which are, within the scope of sound medical judgment suitable for contact with the tissues of and/or for consumption by human beings and animals without excessive toxicity, irritation, allergic response, or other problem complications commensurate with a reasonable risk/benefit ratio.

As used herein, the abbreviation "ppm" means parts per million by weight or volume as applicable.

As used herein, "overgrowth" refers to excessive concentrations of bacteria, algae, yeast, and/or fungi leading to inflammation, infection, pathogenesis and disease. Overgrowth may occur in biofilms and plaques containing polymicrobial mixtures of bacteria, algae, yeast, and/or fungi, such as those found in the biofilms associated with mucositis and with dental plaque. Overgrowths of pathogenic microbes within biofilms are known to increase significantly their resistance to treatment and increase the incidence of inflamed tissues, infection and disease.

As used herein, "prophylactic" means treatment administered to a subject who does not exhibit signs of a disease or exhibits early signs of the disease for the purpose of decreasing the risk of developing pathology associated with the disease.

As used herein, "range" means the area of variation between upper and lower limits on a particular scale. It is understood that any and all whole or partial integers between any ranges set forth herein are included herein.

As used herein, "safe and effective amount" and similar terms mean an amount of an ingredient in composition of sufficient dosage to positively modify the condition to be treated, but low enough to be safe for humans and animals to use without serious side effects (at a reasonable benefit/risk ratio), within the scope of sound medical/dental judgment. "Safe and effective" pertains not only to the dosage amount but also the dosage rate (rate of release) of an active compound or compounds.

As used herein, a "single phase composition" means a composition wherein all ingredients are composed in a single container at the time of composing and are not mixed with other ingredients subsequently. Thus, single phase compositions are ready for use at any time during their shelf-life without further preparation or mixing. The bioavailability of single phase compositions may be determined at any point during their useful shelf-life.

As used herein, "stability" means the prevention of a reaction, reduction or degradation of components comprised in an oral care composition. An oral care composition may be "stable" if the components of the same are not reactive with each other for a reasonable period of time. For example, an oral care composition may be stable if it maintains consumer qualities for a period of 24 months at about 25° C. (ambient temperature) or 6 months at an accelerated temperature of 40°±2° C. and 75%±5% Relative Humidity (RH).

As used herein, "shelf-life" means the length of time compositions maintain the desired stability of the constituent compounds of the oral care composition and the consumer qualities of the composition.

As used herein, "therapeutic" means intended to be administered to a subject who exhibits signs of pathology for the purpose of diminishing or eliminating those signs.

As used herein, "topical composition" means a product which is not intentionally ingested or otherwise applied without recovery for purposes of systemic administration of therapeutic agents, but is retained in the anal, vaginal, aural, oral, nasal, ocular, or urogenital cavities or upon the skin or other outer surfaces of the body, or upon an area of affected soft tissue for a time sufficient to contact substantially all of the surfaces and/or tissues for purposes of administration and delivery of therapeutic agents.

As used herein, "wound" means a laceration, abrasion, puncture, burn, and/or other injury to any one or more soft and/or hard tissue. Exemplary tissues considered for such wound treatment include mucosal tissue and dermal tissue including epidermal tissue, dermal tissue, and subcutaneous tissue (also called hypodermis tissue). As used herein, a wound also encompasses a laceration, a puncture, and/or an avulsion of a fingernail or toenail. A wound can penetrate the tissue partially or completely. A wound can arise accidently or intentionally, e.g., a surgical wound.

As used herein, "dispersing agent" means a compound that improves the separation of particles and prevents settling or clumping of an ingredient(s) in a multicomponent composition.

As used herein, "emollient agent" means a compound that reduces the loss of water from a composition.

As used herein, "suspending or emulsifying agent" means a compound that achieves uniform dispersion of an ingredient(s) in a multicomponent composition.

As used herein, "fragrance" means a compound that provides a pleasing scent or order similar to perfume to a composition.

As used herein, "medium chain triglycerides" and "MCT" refer to medium-chain fatty acids esterified to the glycerol backbone. MCT includes caproic acid (6 carbons or C6), caprylic acid (8 carbons or C8), capric acid (10 carbons or C10), and lauric acid (12 carbons or C12.

As used herein, "fractionated coconut oil" refers coconut oil that has been processed to remove at least fatty acids having greater than 12 carbon atoms. As would be understood by one of ordinary skill in the art, fractionated coconut oil may include lauric acid or fractionated coconut oil may be substantially free and/or essentially free of lauric acid.

As used herein, "cooling agent" means a compound that provides a cooling, soothing, or pleasant feeling when a composition is topically applied to hard and soft tissues.

As used herein, "warming agent" means a compound that provide an olfactory sensation, especially warm sensation. Warming agents are often desired in various cosmetic preparations, such as shaving creams, hand lotions, body lotions, facial preparations, including masks, depilatories.

As used herein, "humectant" means a compound that preserves moisture in a composition. Some embodiments described herein include one or more compounds such as cellulose gum, carboxymethylcellulose, pectin, guar gum, xanthan gum, N-acyl sarcosinate, sodium lauroyl sarcosinate, sodium cocoyl sarcosinate, or sodium myristoyl sarcosinate.

As used herein, "thickener" means a compound that increases viscosity of a composition.

As used herein, "excipient" means a compound that provides physical and consumer goodness properties to a composition for its acceptance. Examples of such properties (but not limited to) are viscosity, appearance, flavor, color, thickness, sweetness, gel like structure, preservative, uniform suspension or combinations thereof.

As used herein, the term "abrasive agent" means a compound that helps to remove coating (or deposits) from hard or soft tissues, such as that on a tooth surface while brushing using a composition, such as a toothpaste.

As used herein, "desensitizing agent" means a compound that helps reduce or alleviate sensitivity and pain. For example, a desensitizing agent in a topical resin, varnish, toothpaste or mouthwash may occlude dentin tubules or may desensitize nerve fibers, blocking the neural transmission.

As used herein, "functional agent" means a compound that performs a health or aesthetic enhancing function. For example, functional agents may be. For example, a desensitizing agent in a topical resin, varnish, toothpaste or mouthwash may occlude dentin tubules or may desensitize nerve fibers, blocking the neural transmission.

All percentages and ratios used herein are by weight of a multi-component composition and not of the overall topical formulation that is delivered, unless otherwise specified. All measurements are made at room temperature i.e., 20-25° C., unless otherwise specified. Heat and humidity, under normal circumstances, may cause such a composition to degrade from liquid to gas, changing its weight and rendering common assay calculations inaccurate.

Detailed Description of Embodiments

Disclosed herein, in various embodiments, are hydrophobic compositions for use in the oral cavity that have functional agents, as well as offer improved absorption into the oral mucosa as compared to aqueous oral care products. Disclosed herein, in various embodiments, are hydrophobic compositions for use in the oral cavity that have functional agents that have anti-microbial properties, as well as offer improved absorption into the oral mucosa as compared to aqueous oral care products. Hydrophobic compositions, as disclosed herein, may better penetrate the biofilm of the oral cavity than aqueous solutions. Moreover, hydrophobic compositions may improve absorption through the oral mucosa. Many pathogens found in the oral cavity tend to have hydrophobic membrane and, thus, these pathogens are more readily taken up in a hydrophobic solution than in an aqueous solution. Moreover, hydrophobic solutions may deliver vitamin D3 and vitamin K3, which assist in bone uptake of calcium. This is especially useful in humans with dental implants or degenerative bone disease, as an oral care composition containing a hydrophobic solution with vitamin D3 and K3 may help to strengthen oral cavity bones by stimulating the uptake of calcium.

Lipid based oral care compositions are better able to penetrate the biofilm on teeth than aqueous solutions. This means that lipid based oral care compositions are able to deliver carefully curated materials directly to and through the biofilm and the harmful bacteria living within or behind the biofilm. The components of the lipid based oral care compositions are themselves hydrophobic or otherwise soluble in oil, particularly in MCT oil as described below. In that regard, the lipid based oral care compositions disclosed herein may be more effective and improving oral health than aqueous oral care compositions. Moreover, the cell membrane of animals, including mammals, is primarily comprised of lipids. As lipids tend to attract other lipids, lipid based oral care compositions tend to bind or otherwise contact animals cell membranes with improved effectiveness over aqueous solutions. In this regard, the cell membranes of bacteria also contain lipids and thus lipid based oral care compositions tend to have a greater affinity for bacterial cell membranes relative to aqueous solution. Where lipid based oral care compositions contain anti-microbial agents, such affinity between the lipid based oral care compositions and the bacterial cell membrane improves delivery and efficacy of the anti-microbial agent.

Moreover, lipid based oral care compositions are able to deliver oil soluble vitamins to tissues in the oral cavity, an advantage over aqueous oral care compositions. In that regard, vitamins such as D3, K2, E, and A may be dissolved in a lipid based oral care composition, which, as described above, has an ability to penetrate biofilm and deliver such oil soluble vitamins to tissues in the oral cavity otherwise unreachable by aqueous oral care compositions.

In various embodiments, the oral care composition is essentially free of and/or substantially free of water. In various embodiments, the oral care composition is essentially free of hydrophilic materials. In various embodiments, the oral care composition contains one or more agents that are hydrophilic. For example, in various embodiments, the oral care composition may contain hydrophilic flavorings, anti-microbials, and/or functional agents. However, in various embodiments, the oral care composition contains no hydrophilic flavorings, anti-microbials, and/or functional agents.

Lipid based oral care compositions are better able to penetrate the biofilm on teeth than aqueous solutions. This means that lipid based oral care compositions are able to deliver carefully curated materials directly to the biofilm and the harmful bacteria living within or behind the biofilm. The components of the lipid based oral care compositions are themselves hydrophobic or otherwise soluble in oil, particularly in MCT oil as described below. In that regard, the lipid based oral care compositions disclosed herein may be more effective and improving oral health than aqueous oral care compositions.

In various embodiments, the oral care composition comprises a lipid based solvent, the lipid based solvent in various embodiments comprising a medium chain triglyceride mixture comprising at least one medium chain triglyceride.

In various embodiments, the medium chain triglyceride mixture comprises fractionated coconut oil that is substantially free of and/or essentially free of fatty acids having greater than 12 carbon atoms. Stated another way, in various embodiments, the medium chain triglyceride mixture is substantially free of and/or essentially free of fatty acids having greater than 12 carbon atoms and comprises at least one of capric acid, caprylic acid, lauric acid, and various mixtures of the same.

In various embodiments, the medium chain triglyceride mixture comprises fractionated coconut oil that is substantially free of and/or essentially free of fatty acids having 12 carbon atoms or greater. Stated another way, in various embodiments, the medium chain triglyceride mixture is substantially free of and/or essentially free of fatty acids having 12 carbon atoms or greater and comprises at least one of capric acid, caprylic acid, and various mixtures of the same. The medium chain triglyceride mixture may range from 100% by weight caprylic acid and 0% capric acid by weight to 100% by weight capric acid and 0% caprylic acid by weight. In various embodiments, the medium chain triglyceride mixture is from about 60% capric acid and 40% caprylic acid to about 60% caprylic acid and 40% capric acid.

Fractionated coconut oil that is substantially free of and/or essentially free of fatty acids having 12 carbon atoms or greater tends to have lower viscosity than coconut oil or fractionated coconut oil having lauric acid. Lower viscosity may be more acceptable to consumers for use in the oral cavity.

Lauric acid is known to exhibit anti-microbial properties. In that regard, in embodiments where fractionated coconut oil that is substantially free of and/or essentially free of fatty acids having 12 carbon atoms is used, a functional agent, such as a hydrophobic anti-microbial agent or agents may be used and/or have its weight percentage increased as opposed to formulations containing lauric acid. For example, in making embodiments where fractionated coconut oil that is substantially free of and/or essentially free of fatty acids having 12 carbon atoms is used, multiple hydrophobic anti-microbial agents may be used (e.g., tea tree oil and oregano oil) and/or the weight percentage of such hydrophobic anti-microbial agents may need to be increased relative to the weight percentage of hydrophobic anti-microbial agents used in embodiments containing lauric acid.

In various embodiments, the fractionated coconut oil that is substantially free of and/or essentially free of fatty acids having greater than 12 carbon atoms may be present in an amount of from about 0.01% to about 99%, for example, from about 0.01%, 0.1%, 10%, 20%, 30%, 40%, 50%, 60%, 70%, 80%, or to about 90% by weight of the oral care composition. In various embodiments, the fractionated coconut oil that is substantially free of and/or essentially free of fatty acids having greater than 12 carbon atoms may be in an amount from about 80% to about 99%, from about 85% to about 98%, or from about 88% to about 98 by weight of the oral care composition. For the avoidance of doubt, the values recited here are of the percentage weight of fractionated coconut oil that is substantially free of and/or essentially free of fatty acids having greater than 12 carbon atoms relative to the total weight of the oral care composition.

In various embodiments, the fractionated coconut oil that is substantially free of and/or essentially free of fatty acids having 12 carbon atoms or greater may be present in an amount of from about 0.01% to about 99%, for example, from about 0.01%, 0.1%, 10%, 20%, 30%, 40%, 50%, 60%, 70%, 80%, or to about 90% by weight of the oral care composition. In various embodiments, the fractionated coconut oil that is substantially free of and/or essentially free of fatty acids having 12 carbon atoms or greater may be in an amount from about 80% to about 99%, from about 85% to about 98%, or from about 88% to about 98 by weight of the oral care composition. For the avoidance of doubt, the values recited here are of the percentage weight of fractionated coconut oil that is substantially free of and/or essentially free of fatty acids having 12 carbon atoms or greater relative to the total weight of the oral care composition.

In various embodiments, the fractionated coconut oil may comprise and/or consist essentially of caproic acid and lauric acid. Together, the caproic acid and lauric acid be present in an amount of from about 0.01% to about 99%, for example, from about 0.01%, 0.1%, 10%, 20%, 30%, 40%, 50%, 60%, 70%, 80%, or to about 90% by weight of the oral care composition. In various embodiments, the fractionated coconut oil that is substantially free of and/or essentially free of fatty acids having 12 carbon atoms or greater may be in an amount from about 80% to about 99%, from about 85% to about 98%, or from about 88% to about 98 by weight of the oral care composition. For the avoidance of doubt, the values recited here are of the percentage weight of fractionated coconut oil that is substantially free of and/or essentially free of fatty acids having 12 carbon atoms or greater relative to the total weight of the oral care composition.

In various embodiments, the oral care composition comprises at least on functional agent. The functional agent may comprise one or more of an anti-microbial agent, a flavoring agent, a salivary stimulating agent, a hydrophobic herbal extract and/or a vitamin.

In various embodiments, the oral care composition comprises a functional agent comprising a hydrophobic anti-microbial agent. A hydrophobic anti-microbial agent may refer to an anti-microbial agent that is soluble in fractionated coconut oil that is substantially free of fatty acids having 12 carbon atoms or greater at 25° C. Hydrophobic anti-microbial agents comprise essential oils such as botanical essential oils, for example, clove oil, oregano oil, tea tree oil (also known as melaleuca oil), peppermint oil, spearmint oil, lemongrass oil, thyme oil, myrrh oil, eucalyptus oil, cinnamon oil and/or combinations of the same. Clove oil is rich in eugenol, which has various anti-microbial properties. Moreover, oregano oil and tea tree oil are known to have anti-microbial properties. Oregano oil contains various terpenes, phenols and terpenoids. For example, oregano oil may comprise carvacrol, thymol, and rosmarinic acid. Carvacrol is believed to have anti-bacterial properties while thymol is believed to have anti-fungal properties.

In various embodiments, hydrophobic antimicrobial agents include a diverse range of synthetic chlorinated substances, various polymers including peptides, certain organosulfur compounds, and many essential oils. Chlorinated substances include, but are not limited to, triclosan and triclocarban. Antimicrobial polymers include, but are not limited to, bacitracin, boceprevir, dalbavancin, daptomycin, enfuvirtide, oritavancin, teicoplanin, telaprevir, telavancin, vancomycin and guavanin-2. Antimicrobial organosulfur compounds include, but are not limited to, allicin, 3-vinyl-4H-1,2-dithiin, 2-vinyl-4H-1,3-dithiin, ajoene and diallyl disulfide. Hydrophobic antimicrobial essential oils include, but are not limited to, oregano oil, clove oil, *Aegle marmelos* oil, *Ageratum* oil, *Cymbopogon nardus* (citronella) oil, peppermint oil, tea tree oil, cedarwood oil, lavender oil, eucalyptus oil, lemongrass oil, lemon oil, orange oil, *Cymbopogon martinii* (palmarosa) oil, and patchouli oil.

In various embodiments, the hydrophobic anti-microbial agent may be present in an amount of from about 0.01% to about 10%, for example, from about 0.01%, 0.1%, 0.2%, 1%, 2%, 3%, 4%, 5%, 6%, 7%, 8%, or to about 10% by weight of the oral care composition. In various embodiments, the hydrophobic anti-microbial agent may be in an amount from about 0.15% to about 1.2%, from about 0.18% to about 1.0%, or from about 0.2% to about 0.3% by weight of the oral care composition. For the avoidance of doubt, the values recited here are of the percentage weight of hydrophobic anti-microbial agent relative to the total weight of the oral care composition. It is noted that various embodiments may have more than one hydrophobic anti-microbial agent. The values given herein relate to the sum of hydrophobic anti-microbial agents in the oral care composition.

In various embodiments, the oral care composition comprises a functional agent comprising a hydrophobic herbal extract. Herbal extracts comprise various phytochemicals that are extracted from herbs and/or other plants. In various embodiments, the hydrophobic herbal extracts are hydrophobic. In that regard, hydrophobic herbal extracts may comprise an oil, wax, resin, or other hydrophobic form and are otherwise oil soluble, for example soluble in MCT. In various embodiments, the oral care composition comprises a hydrophobic herbal extract extracted using supercritical carbon dioxide ($CO_2$). Supercritical carbon dioxide extraction comprises subjecting plant material to carbon dioxide at temperatures and pressures above the critical point of carbon dioxide to form a supercritical fluid. Supercritical carbon dioxide thus penetrates the plant matter and extracts various components from the plant matter, including various hydrophobic substances. The extract-laden supercritical carbon dioxide may be boiled in various stages, thus releasing the plant material components in a residual oil in each stage. In that regard, supercritical carbon dioxide may be tuned during various separation stages to produce fractions of hydrophobic herbal extracts grouped by molecular weight. Accordingly, hydrophobic herbal extracts may be fractionated into waxes, heavy oils/resins, and light oils. Stated another way, supercritical carbon dioxide extraction provides an effective way to remove targeted components from plant materials. In various embodiments, hydrophobic herbal extracts may be fractionated by molecular weight. However, in various embodiments, hydrophobic herbal extracts may contain all or substantially all types of substances present in the plant material from which it is extracted. Supercritical carbon dioxide extraction provides the ability to extract various substances from plant material without the use of volatile organic solvents such as hexane or ethanol.

In various embodiments, a hydrophobic herbal extract comprises ashwagandha extract, neem extract, cinnamon extract, neem extract, clove extract, roman chamomile extract, cardamom extract, tea tree oil extract, triphala extract, amla extract, sea buckthorn extract, licorice, echinacea extract, marigold extract, ginger extract, bacopa extract, hemp extract (CBD), schezwan extract, spilanthes extract, thyme extract, and sunflower oil extract, and turmeric (*Curcuma longa*) extract. In various embodiments, a hydrophobic herbal extract comprises supercritical carbon dioxide extracted ashwagandha (Withania somnifera), supercritical carbon dioxide extracted neem, supercritical carbon dioxide extracted cinnamon, supercritical carbon dioxide extracted neem, supercritical carbon dioxide extracted clove, supercritical carbon dioxide extracted roman chamomile, supercritical carbon dioxide extracted cardamom, supercritical carbon dioxide extracted tea tree, supercritical carbon dioxide extracted sunflower, and supercritical carbon dioxide extracted turmeric. Though known to one of skill in the art, supercritical carbon dioxide extracted hydrophobic herbal extracts are substantially free of residual organic solvents used in other extraction methods. Moreover, supercritical carbon dioxide extracted hydrophobic herbal extracts may be complete, meaning that such hydrophobic herbal extracts contain all or substantially all the types of phytochemicals in the raw plant material or supercritical carbon dioxide extracted hydrophobic herbal extracts may be fractionated, meaning that such hydrophobic herbal extracts contain a subset of the types of phytochemicals in the raw plant material. For the avoidance of doubt, supercritical carbon dioxide extracted hydrophobic herbal extracts are different compositions than hydrophobic herbal extracts produced using organic solvents. As stated above, supercritical carbon dioxide extracted hydrophobic herbal extracts are substantially free of residual organic solvents that are contained in hydrophobic herbal extracts produced using organic solvents. Moreover, supercritical carbon dioxide extracted hydrophobic herbal extracts have a more tailored selection of compounds due to the precise fractionation capabilities of supercritical carbon dioxide extraction. Thus, supercritical carbon dioxide extracted hydrophobic herbal extracts are compositions that are not equivalent to hydrophobic herbal extracts produced using organic solvents.

Supercritical carbon dioxide extracted ashwagandha comprises alkaloids (isopelletierine, anaferine, cuseohygrine, anahygrine), steroidal lactones (withanolides, withaferins) and/or saponins. Supercritical carbon dioxide extracted ashwagandha is believed to have anti-inflammatory activity as well as other positive health benefits. Use in an oral care composition may help to reduce oral inflammation (e.g., gum inflammation) and anxiety that may lead to the grinding of teeth.

Supercritical carbon dioxide extracted turmeric comprises curcuminoids (curcumin). Supercritical carbon dioxide extracted turmeric is believed to have anti-inflammatory activity as well as other positive health benefits such as anti-anxiety health effects. Use in an oral care composition may help to reduce oral inflammation (e.g., gum inflammation).

In various embodiments, supercritical carbon dioxide extracted turmeric and supercritical carbon dioxide extracted ashwagandha comprise hydrophobic components (e.g., curcumin) that may be solubilized by a medium chain triglyceride and/or medium chain triglyceride that is substantially free of and/or essentially free of fatty acids having 12 carbon atoms or greater. Agitation may be used to solubilize supercritical carbon dioxide extracted turmeric and supercritical carbon dioxide extracted ashwagandha in a medium chain triglyceride and/or medium chain triglyceride that is substantially free of and/or essentially free of fatty acids having 12 carbon atoms or greater. As described herein, use of a medium chain triglyceride and/or medium chain triglyceride that is substantially free of and/or essentially free of fatty acids having 12 carbon atoms or greater tends to enable the oral care composition to penetrate biofilm in the oral cavity and on teeth to contact underlying bacteria and other microorganisms. In that regard, the use of a medium chain triglyceride and/or medium chain triglycerides having greater than 10 carbon atoms allows greater contact between a hydrophobic herbal extract and oral tissues as well as microorganisms in the oral cavity.

In various embodiments, the hydrophobic herbal extract may be present in an amount of from about 0.01% to about 10%, for example, from about 0.01%, 0.1%, 0.2%, 1%, 2%, 3%, 4%, 5%, 6%, 7%, 8%, or to about 10% by weight of the oral care composition. In various embodiments, the hydrophobic herbal extract may be in an amount from about 0.15% to about 2%, from about. 18% to about 1.5%, or from about 0.2% to about 1% by weight of the oral care composition. For the avoidance of doubt, the values recited here are of the percentage weight of the hydrophobic herbal extract relative to the total weight of the oral care composition. It is noted that various embodiments may have more than one the hydrophobic herbal extract. The values given herein relate to the sum of the hydrophobic herbal extracts in the oral care composition.

In various embodiments, the oral care composition comprises a functional agent comprising a hydrophobic flavoring agent. A hydrophobic flavoring agent may refer to a flavoring agent that is soluble in fractionated coconut oil that is substantially free of and/or essentially free of fatty acids having 12 carbon atoms or greater at 25° C.

In various embodiments, a hydrophobic flavoring agent comprises essential oils such as botanical essential oils, for example, spearmint oil, peppermint oil, cardamom oil, cinnamon oil, rose oil, jasmine oil, orange oil, lemon oil, vanilla oil and combinations thereof. In various embodiments, suitable flavoring agents can include, for example, flavors, such as, natural flavor oils, artificial flavors, and combinations thereof. Nonlimiting examples of flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Suitable flavoring agents also include, for example, artificial, natural and synthetic fruit flavors such as vanilla, citrus oils (e.g., lemon, orange, lime, and grapefruit), and fruit essences (e.g., apple, pear, peach, grape, strawberry, raspberry, cherry, plum, pineapple, and apricot), and the like, and combinations thereof. Other flavoring agents that may be included individually or in combination include, for example, anethole, menthol, menthone, L-menthyl acetate, eucalyptol, borneol, borneol acetate, camphor, 1,8-cineole, cinnamaldehyde, benzaldehyde, citral, thujone, eugenol, limonene, geraniol, citronellol, citronellal, pinene, linalool, thymol, carvone, caryophyllene, linalyl acetate, methyl salicylate, 3,3,5-trimethylcyclohexanol, methoxycyclohexanol, benzyl alcohol, anise alcohol, cinnamyl alcohol, β-phenyl ethyl alcohol (2-phenylethanol), cis-3-hexenol, musk xylol, isoeugenol, methyl eugenol, α-amylcinnamic aldehyde, anisaldehyde, n-butyl aldehyde, cumin aldehyde, cyclamen aldehyde, decanal, isobutyl aldehyde, hexyl aldehyde, heptyl aldehyde, n-nonyl aldehyde, nonadienol, hydroxycitronellal, benzaldehyde, methyl nonyl acetaldehyde, dodecanol, α-hexylcinnamic aldehyde, undecenal, heliotropin, vanillin, ethyl vanillin, methyl amyl ketone, methyl β-naphthyl ketone, methyl nonyl ketone, musk ketone, diacetyl, acetyl propionyl, acetyl butyryl, acetophenone, p-methyl acetophenone, ionone, methyl ionone, amyl butyrolactone, diphenyl oxide, methyl phenyl glycidate, γ-nonyl lactone, coumarin, cineole, ethyl methyl phenyl glycidate, methyl formate, isopropyl formate, linalyl formate, ethyl acetate, octyl acetate, methyl acetate, benzyl acetate, butyl propionate, isoamyl acetate, isopropyl isobutyrate, geranyl isovalerate, allyl capronate, butyl heptylate, octyl caprylate octyl, methyl heptynecarboxylate, methine octynecarboxylate, isoacyl caprylate, methyl laurate, ethyl myristate, methyl myristate, ethyl benzoate, benzyl benzoate, methylcarbinylphenyl acetate, isobutyl phenylacetate, methyl cinnamate, cinnamyl cinnamate, ethyl anisate, methyl anthranilate, ethyl pyruvate, ethyl α-butyl butylate, benzyl propionate, butyl acetate, butyl butyrate, p-tert-butylcyclohexyl acetate, cedryl acetate, citronellyl acetate, citronellyl formate, p-cresyl acetate, ethyl butyrate, ethyl caproate, ethyl cinnamate, ethyl phenylacetate, ethylene brassylate, geranyl acetate, geranyl formate, isoamyl salicylate, isoamyl isovalerate, isobornyl acetate, linalyl acetate, methyl anthranilate, methyl dihydrojasmonate, β-phenylethyl acetate, trichloromethylphenyl carbinyl acetate, terpinyl acetate, vetiveryl acetate, and mixtures thereof.

In various embodiments, the hydrophobic flavoring agent may be present in an amount of from about 0.01% to about 10%, for example, from about 0.01%, 0.1%, 0.2%, 1%, 2%, 3%, 4%, 5%, 6%, 7%, 8%, or to about 10% by weight of the oral care composition. In various embodiments, the hydrophobic anti-microbial agent may be in an amount from about 0.15% to about 4%, from about. 18% to about 3.0%, or from about 0.2% to about 2.5% by weight of the oral care composition. For the avoidance of doubt, the values recited here are of the percentage weight of flavoring agent relative to the total weight of the oral care composition. It is noted that various embodiments may have more than one hydrophobic flavoring agent. The values given herein relate to the sum of hydrophobic flavoring agents in the oral care composition.

In various embodiments, the oral care composition comprises a functional agent comprising a salivary stimulating agent. In various embodiments, a salivary stimulating agent comprises a hydrophobic material that is capable of triggering a salivary response in mammals. In various embodiments, essential oils such as botanical essential oils, for example, are used as salivary stimulating agents, for example, cardamom oil, lavender oil, eucalyptus oil, fennel oil, schezwan oil (e.g., a light vegetable oil such as canola oil infused with chili peppers), spilanthes oil, menthol oil, and/o combinations of the same.

In various embodiments, the salivary stimulating agent may be present in an amount of from about 0.01% to about 10%, for example, from about 0.001%, 0.01%, 0.02%, 1%, 2%, 3%, 4%, 5%, 6%, 7%, 8%, or to about 10% by weight or volume of the oral care composition. In various embodiments, the salivary stimulating agents may be in an amount from about 0.005% to about 0.04%, from about 0.01% to about 0.1%, or from about 0.015% to about 0.5%. For the avoidance of doubt, the values recited here are of the percentage weight of salivary stimulating agent relative to the total weight of the oral care composition. It is noted that various embodiments may have more than one salivary stimulating agent. The values given herein relate to the sum of salivary stimulating agent in the oral care composition.

In various embodiments, the oral care composition comprises a hydrophobic vitamin. A hydrophobic vitamin may refer to a vitamin that is soluble in fractionated coconut oil that is substantially free of fatty acids having 12 carbon atoms or greater at 25° C. Hydrophobic vitamins include vitamin E, vitamin A (retinol), beta carotene, vitamin D (vitamins, D2, D3, D4 and D5), and vitamin K (vitamin K1 and vitamin K2).

In various embodiments, the hydrophobic vitamin may be present in an amount of from about 0.01% to about 10%, for example, from about 0.01%, 0.1%, 0.2%, 1%, 2%, 3%, 4%, 5%, 6%, 7%, 8%, or to about 10% by weight of the oral care composition. In various embodiments, the hydrophobic vitamin may be in an amount from about 0.15% to about 1.2%, from about 0.18% to about 1.0%, or from about 0.02% to about 0.08% by weight of the oral care composition. For the avoidance of doubt, the values recited here are of the percentage weight of hydrophobic vitamin relative to the total weight of the oral care composition. It is noted that various embodiments may have more than hydrophobic vitamin. The values given herein relate to the sum of hydrophobic vitamins in the oral care composition.

In various embodiments, the oral care composition comprises a sweetening agent. Suitable sweetening agents may be soluble in fractionated coconut oil that is substantially free of fatty acids having 12 carbon atoms or greater at 25° C. In various embodiments, the sweetening agent comprises sucrose, aspartame, acesulfame, stevia, saccharin; saccharin salts, especially sodium saccharin; sucralose, sodium cyclamate, and mixtures thereof. In various embodiments, sweetening agents that are polyhydroxy alcohols such as xylitol, mannitol, and sorbitol. In various embodiments, the oral care composition is essentially free of polyhydroxy sweeteners such as xylitol, mannitol, and sorbitol. In various embodiments, a sweetening agent comprises sucrose, stevia, allulose, sucralose, acesulfame, aspartame, cyclamate, or saccharin, and combinations thereof. In some embodiments, the sweetener may be in an amount of from about 0.01% to about 0.5%, for example, from about 0.01%, 0.02%, 0.05%, 0.1%, 0.2%, 0.3%, 0.4%, or to about 5.0% by weight or volume of the oral care composition. In various embodiments, the sweetener may be in an amount from about 0.05% to about 0.5%, from about 0.1% to about 0.2%, from about 0.01% to about 0.5%, or from 0.01% to about 0.2%.

In various embodiments, the oral care composition comprises a carrier. In various embodiments, suitable carrier(s) comprise those that satisfy various considerations based on compatibility with the other ingredients required for the efficacy, consumer qualities, cost, and contribution to shelf stability. In various embodiments, the selected carrier does not substantially reduce either the stability of the oral care composition or its efficacy. Examples of suitable carriers variously include gelling agents, whitening agents, flavoring systems, coloring agents, abrasive agents, foaming agents, desensitizing agents, dispersants, humectants, analgesic and anesthetic agents, anti-inflammatory agents, anti-malodor agents, anti-microbial agents, anti-plaque agents, anti-viral agents, biofilm disrupting, dissipating or inhibiting agents, cellular redox modifiers, antioxidants, cytokine receptor antagonists, dental anti-calculus agents, fluoride ion sources, hormones, metalloproteinase inhibitors, enzymes, immune-stimulatory agents, lipopolysaccharide complexing agents, tissue growth factors, vitamins and minerals, water, and mixtures thereof.

In various embodiments, the oral care composition may further comprise one or more additional functional agents. In various embodiments, an additional active ingredient may include one or more of the following additional ingredients: fluoride ion sources, anti-microbial agents, analgesic compounds, anti-inflammatory agents, anti-malodor agents, anti-plaque agents, anti-viral agent, biofilm disrupting, dissipation or inhibiting agents, hormones, enzymes, metalloproteinase inhibitors, immune-stimulatory agents, and numbing agents. In further embodiments, the oral care composition comprises one or more excipients including any of abrasives, humectants, thickeners, sweeteners, moisturizers, flavors, colors, fillers, and extenders. In various embodiments, use of the oral care composition disclosed herein may relieve toothache, decrease oversensitivity in the gums, freshen breath (reduce malodor), and taste pleasant.

In various aspects, the oral care composition comprises a pharmaceutically acceptable carrier and/or excipients. Pharmaceutically-acceptable carriers include one or more compatible solid or liquid materials, including diluents or encapsulating substances, which are suitable for topical administration to the human or animal body and provide physical action or consumer-goodness characteristics acceptable to the user. The pharmaceutical carriers and/or excipients may be combined into the oral care composition without interaction in any manner that would reduce the compounds therein, the consumer goodness qualities, the safety and effectiveness of the composition in treating or preventing anal, aural, vaginal, oral, nasal, ocular, urogenital, foot, and skin disorders, or diseases of the skin or foot and the inflammation and infection of tissues therein. The choice of a pharmaceutically acceptable carrier and/or excipient may be determined by the way the composition is to be introduced into the anal, vaginal, aural, oral, nasal, ocular, or urogenital cavity, or to be applied topically in foot care and skin care. The pharmaceutically acceptable carrier and/or excipient may depend on secondary considerations such as, but not limited to, consumer goodness qualities, costs and shelf-life stability.

In various embodiments, the pharmaceutically acceptable carrier and/or excipients may be in an amount of from about 0.01% to about 30%, for example, from about 0.01%, 0.1%, 1%, 2%, 3%, 4%, 5%, 6%, 7%, 8%, 9% or to about 10% by weight or volume of the oral care composition. In other embodiments, the pharmaceutically acceptable carrier may be in an amount from about 0.01% to about 60%, from about 0.01% to about 30%, or from about 0.01% to about 20%. For the avoidance of doubt, the values recited here are of the percentage weight of pharmaceutically acceptable carrier relative to the total weight of the oral care composition. It is noted that various embodiments may have more than one pharmaceutically acceptable carrier. The values given herein relate to the sum of pharmaceutically acceptable carrier in the oral care composition.

In aspects, the oral care composition further comprises an abrasive agent. Abrasives are useful as carriers of the oral care compositions intended for specific oral and dermal applications and uses. For example, abrasive materials provide physical abrasion between toothbrush and teeth to clean pellicle, cuticle, biofilm, plaque, stain, and calculus, while also contributing to the structure of various embodiments and maintaining stability of the overall formulation. In certain dermal embodiments, it may be desirable for the composition to assist in the exfoliation of skin tissues. In various embodiments, the abrasive material is selected from a composition that does not excessively abrade skin, enamel, dentin, or other hard or soft tissues. In various embodiments, the abrasive agent comprises, for example, silicas, hydrated silicas, including gels and precipitates; insoluble sodium polymetaphosphate; hydrated alumina; calcium carbonate; calcium hydrogen orthophosphate dihydrate (known in the trade as "dicalcium phosphate"); tricalcium phosphate, calcium polymetaphosphate, sodium bicarbonate and resinous abrasive materials. In various embodiments, a mixture of abrasives may also be used.

In various embodiments, the abrasive is present in an amount from about 0.01% to about 70%, for example, from about 0.01%, 0.1%, 1%, 2%, 5%, 10%, 15%, 20%, 30%, 40%, 50% or to about 70% by weight of the multi-component composition. In various embodiments, the abrasive agent may be present in an amount from about 6% to about 70%, from about 10% to about 50%, or from about 6% to about 70%, from about 20% to about 70%. In various embodiments, such as nasal or oral sprays, oral or vaginal rinses and non-abrasive gel compositions, such as those used in wound healing, may comprise no abrasive.

In aspects, an oral care composition comprises a coloring agent. Preferably, the consumer goodness qualities of the oral care composition are not degraded by the coloring agent. Coloring enables the consumer to more readily ascertain usage and dosage. Certain colors of the composition may be deemed undesirable for certain anal, vaginal, aural, ocular, oral or urogenital applications. In various embodiments, no coloring agent is present. In various embodiments, a coloring agent includes, FD&C Blue No. 1 or titanium dioxide. In various embodiments, the coloring agent may be in an amount of from about 0.01% to about 10%, for example, from about 0.01%, 0.1%, 1%, 2%, 3%, 4%, 5%, 6%, 7%, 8%, or to about 10% by weight or volume of the oral care composition. In further embodiments, the coloring agent may be in an amount from about 0.5% to about 10%, from about 1% to about 10%, or from about 0.01% to about 2%, or from 0.8% to about 1.1%.

In various embodiments, an oral care composition further comprises one or more humectants. Suitable humectants include those that include at least one of the following: serves to keep pastes and gels and suspensions from hardening or losing their consumer goodness qualities when exposed to air, to add to the compositions a moist feel to the consumer goodness qualities and, for particular humectants orally applied, to impart desirable sweetness of flavor, such as toothpaste compositions. In various embodiments, the humectant comprises polyhydroxy alcohols, including arabitol, erythritol, glycerol, maltitol, mannitol, sorbitol, and/or xylitol. Polyhydroxy alcohols are commonly accepted excipients and most belong to the Generally Recognized as Safe (GRAS) category for pharmaceutical, cosmetic, and food products. Other compounds which provide moist texture for suitable formulations may also be used. In various embodiments, sorbitol may be a humectant comprised in the oral care composition.

In various embodiments, the humectant may be present in an amount of from about 0.001% to about 70%, for example, from about 0.001%, 0.01%, 1%, 2%, 5%, 10%, 20%, 30%, 40%, 50%, or to about 70% by weight or volume of the oral care composition. In further embodiments, the humectant may be in an amount from about 1% to about 15%, from about 15% to about 55%, or from about 25% to about 55%.

In various embodiments, the oral care composition comprises a fluoride ion source. In various embodiments, no fluoride ion source is present. In various embodiments, the oral care composition includes free fluoride ions or covalently bound fluorine in a form that may be hydrolyzed by oral enzymes to yield free fluoride ions. Free fluoride ions comprise sodium fluoride, silver diamine fluoride, stannous fluoride, or indium fluoride. Covalently bound fluorine, which can be enzymatically hydrolyzed to yield free fluoride, may be provided by sodium monofluorophosphate. In various embodiments, sodium fluoride may be comprised in the oral care composition as the source of free fluoride ions.

In various embodiments, an oral care composition further comprises a source of fluoride ion providing fluoride ions from about 0 ppm to about 5000 ppm, or from about 50 ppm to about 3500 ppm, from about 500 ppm to about 3500 ppm. In various embodiments, the fluoride ion source may be in an amount of from about 0% to about 2.0%, for example, from about 0.01%, 0.1%, 0.15%, 0.2%, 0.3%, 0.4%, 0.5%, 0.6%, 0.7%, 0.8%, or to about 2.0% by weight or volume of the oral care composition. In further embodiments, the fluoride ion source may be in an amount from about 0.0% to about 0.03%, from about 0.0% to about 0.7%, from about 0.1% to about 0.8%, from about 0.01% to about 0.07%, or from about 0.0% to about 0.8%. A composition is referred as fluoride-free when the source of fluoride ion source is 0% or when the composition is essentially free of fluoride as described herein.

In aspects, an oral care composition further comprises a thickening or binding agent. The thickening or binding agent may provide desired consumer goodness qualities appropriate to the oral care composition, such as the desirable consistency or viscosity of the composition, to provide desirable dosage and to adhere to hard or soft tissues in a topical application. Examples of thickening or binding agents include carboxyvinyl polymers, seaweed derivatives such as carrageenan, hydroxyethyl cellulose, laponite, powdered polyethylene, and salts of cellulose ethers such as sodium carboxymethylcellulose and sodium carboxymethyl hydroxyethyl cellulose. Natural gums such as gum karaya, guar gum, xanthan gum, gum arabic, and gum tragacanth can also be used. Colloidal magnesium aluminum silicate or finely divided silica may be used as part of the thickening or binding agent to further improves texture. Higher concentrations of thickening agents can be used for chewing gums, lozenges (including breath mints), sachets, non-abrasive gels and gels intended for use in wound-healing, vaginal or oral disease. In various embodiments, for example, in various mouthwash or rinse formulations of the presently disclosed oral care compositions comprise no thickening or binding agents. Indeed, various mouthwash or rinse formulations of the presently disclosed oral care compositions have relatively low viscosities.

In various embodiments, the thickening or binding agent may be present in an amount of from about 0% to about 15%, for example, from about 0.01%, 0.1%, 1%, 2%, 3%, 4%, 5%, 6%, 7%, 8%, or to about 15% by weight or volume of the oral care composition. In various embodiments, the thickening or binding agent may be in an amount from about 0.1% to about 15%, from about 2.0% to about 10%, from about 4% to about 8%, from about 1.0% to about 4.0%, or from about 5.0% to about 7.0%.

In various embodiments, the oral care composition further comprises a desensitizing agent. The desensitizing agent may be provided for temporary relief from pain to hard or soft tissues. In various embodiments, the desensitizing agent comprises compounds such as strontium chloride, strontium acetate, arginine, hydroxyapatite, nano-hydroxyapatite (nano-HAp), calcium sodium phosphosilicate, potassium chloride or potassium nitrate. In various embodiments, the compositions may be essentially free of compounds, such as sodium lauryl sulfate, that irritate sensitive body cavities such as anal, vaginal, nasal, ocular, oral, and urogenital. Examples of sensitivities and resultant diseases oral cavity include canker sores, oral mucositis, and dry mouth.

In various embodiments, the oral care composition further comprises a preservative. In embodiments, the preservative comprises a methyl paraben, propyl paraben, disodium EDTA, benzyl alcohol, benzoic acid, or sodium benzoate. In various embodiments, the preservative may be present in an amount of from about 0% to about 2%, for example, 0.01%, 0.1%, 1%, or 2% by weight or volume of the oral care composition. In further embodiments, the surfactant may be in an amount from about 0.1% to about 0.15%, from about 0.2% to about 1%, from about 0.01% to 0.5%, or from about 0.4% to about 0.8%.

In various embodiments, the oral care composition may be specifically formulated for use in humans and animals, for example in the form of rinses, gels, pastes, creams, washes, sprays, lozenges, therapeutic floss, tape, patches, compresses, or strips, for use in skin care, oral care, urogenital care, foot care, wound healing and as a solution used in irrigation devices for use in the oral and other body cavities.

In various embodiments, the cloud point of an oral care composition is less than-5 degrees C. In various embodiments, the viscosity of an oral care composition is 0-40 cp.

In various embodiments, the oral care composition is suitable for a variety of indications, including treatment and prevention of oral or vaginal malodor, as well as ocular, anal, nasal and skin care and other topical uses. Suitable topical indications include anal, aural, oral, nasal, ocular, urogenital, foot-care and skin-care conditions and diseases. The oral care composition may be suitable for select indications, including antimicrobial, antiseptic, antioxidant, bactericidal and bacteriostatic, biofilm penetration, biofilm dissipation and reduction, coagulant, deodorant, desensitizing, disinfectant, fungicidal and fungistatic, herbicidal, tissue damage reduction, bleaching, stain removal, and tooth whitening. Compositions herein are suitable for use in a variety of forms, including rinses, gels, pastes, creams, washes, sprays, lozenges, floss, tape, patches, bandages, compresses, wraps, and strips.

Exemplary Composition I: Oil Pulling Oil

Various oral care compositions may comprise: from about 10% to about 99% by weight medium chain triglyceride and/or medium chain triglyceride mixture. In various embodiments, the medium chain triglyceride mixture is substantially free of and/or essentially free of fatty acids having 12 carbon atoms or greater and comprises at least one of capric acid, caprylic acid, and various mixtures of the same, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, salivary stimulating agent from 0.01% to 15% by weight of the total oral care composition, a vitamin from 0.01% to 5% by weight of the total oral care composition Various oral care compositions may comprise: from about 10% to about 99% by weight medium chain triglyceride mixture comprising fractionated coconut oil that is substantially free of and/or essentially free of fatty acids having 12 carbon atoms or greater. Stated another way, in various embodiments, the medium chain triglyceride mixture is substantially free of and/or essentially free of fatty acids having 12 carbon atoms or greater and comprises at least one of capric acid, caprylic acid, and various mixtures of the same, peppermint oil from 0.01% to 15% by weight of the total oral care composition, stevia from 0.01% to 5% by weight of the total oral care composition, spearmint oil from 0.01% to 15% by weight of the total oral care composition, clove oil from 0.01% to 15% by weight of the total oral care composition, tea tree oil from 0.01% to 15% by weight of the total oral care composition, cardamom oil from 0.01% to 15% by weight of the total oral care composition, oregano oil from 0.01% to 15% by weight of the total oral care composition, fennel oil from 0.01% to 15% by weight of the total oral care composition, vitamin E from 0.01% to 5% by weight of the total oral care composition, vitamin D3 from 0.01% to 15% by weight of the total oral care composition, vitamin K2 oil from 0.01% to 15% by weight of the total oral care composition.

Various oral care compositions may comprise: from about 85% to about 97% by weight medium chain triglyceride mixture comprising fractionated coconut oil that is substantially free of and/or essentially free of fatty acids having 12 carbon atoms or greater. Stated another way, in various embodiments, the medium chain triglyceride mixture is substantially free of and/or essentially free of fatty acids having 12 carbon atoms or greater and comprises at least one of capric acid, caprylic acid, and various mixtures of the same, peppermint oil from 3% to 5% by weight of the total oral care composition, stevia from 0.01% to 0.09% by weight of the total oral care composition, spearmint oil from 0.01% to 0.2% by weight of the total oral care composition, clove oil from 0.01% to 0.15% by weight of the total oral care composition, tea tree oil from 0.01% to 0.2% by weight of the total oral care composition, cardamom oil from 0.01% to 0.2% by weight of the total oral care composition, oregano oil from 0.01% to 0.1% by weight of the total oral care composition, fennel oil from 0.01% to 0.05% by weight of the total oral care composition, vitamin E from 0.01% to 0.1% by weight of the total oral care composition, vitamin D3 from 0.001% to 0.003 by weight of the total oral care composition, vitamin K2 oil from 0.0001% to 0.01% by weight of the total oral care composition.

Exemplary Composition II: Oil Pulling Oil

Various oral care compositions may comprise: from about 10% to about 99% by weight medium chain triglyceride and/or medium chain triglyceride mixture. In various embodiments, the medium chain triglyceride mixture is substantially free of and/or essentially free of fatty acids having greater than 12 carbon atoms or greater and comprises at least one of capric acid, caprylic acid, lauric acid, and various mixtures of the same, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, salivary stimulating agent from 0.01% to 15% by weight of the total oral care composition, a vitamin from 0.01% to 5% by weight of the total oral care composition Various oral care compositions may comprise: from about 10% to about 99% by weight medium chain triglyceride mixture comprising fractionated coconut oil that is substantially free of and/or essentially free of fatty acids having greater than 12 carbon atoms. Stated another way, in various embodiments, the medium chain triglyceride mixture is substantially free of and/or essentially free of fatty acids having 12 carbon atoms or greater and comprises at least one of capric acid, caprylic acid, lauric acid, and various mixtures of the same, peppermint oil from 0.01% to 15% by weight of the total oral care composition, stevia from 0.01% to 5% by weight of the total oral care composition, spearmint oil from 0.01% to 15% by weight of the total oral care composition, clove oil from 0.01% to 15% by weight of the total oral care composition, tea tree oil from 0.01% to 15% by weight of the total oral care composition, cardamom oil from 0.01% to 15% by weight of the total oral care composition, oregano oil from 0.01% to 15% by weight of the total oral care composition, fennel oil from 0.01% to 15% by weight of the total oral care composition, vitamin E from 0.01% to 5% by weight of the total oral care composition, vitamin D3 from 0.01% to 15% by weight of the total oral care composition, vitamin K2 oil from 0.01% to 15% by weight of the total oral care composition.

Various oral care compositions may comprise: from about 85% to about 96% by weight medium chain triglyceride mixture comprising fractionated coconut oil that is substantially free of and/or essentially free of fatty acids having greater than 12 carbon atoms. Stated another way, in various embodiments, the medium chain triglyceride mixture is substantially free of and/or essentially free of fatty acids having greater than 12 carbon atoms and comprises at least one of capric acid, caprylic acid, lauric acid, and various mixtures of the same, peppermint oil from 3% to 5% by weight of the total oral care composition, stevia from 0.01% to 0.09% by weight of the total oral care composition, spearmint oil from 0.01% to 0.2% by weight of the total oral care composition, clove oil from 0.01% to 0.15% by weight of the total oral care composition, tea tree oil from 0.01% to 0.2% by weight of the total oral care composition, cardamom oil from 0.01% to 0.2% by weight of the total oral care composition, oregano oil from 0.01% to 0.1% by weight of the total oral care composition, fennel oil from 0.01% to 0.05% by weight of the total oral care composition, vitamin E from 0.01% to 0.1% by weight of the total oral care composition, vitamin D3 from 0.001% to 0.003 by weight of the total oral care composition, vitamin K2 oil from 0.0001% to 0.01% by weight of the total oral care composition.

Exemplary Composition III: Oil Pulling Oil

Various oral care compositions may comprise: from about 10% to about 99% by weight medium chain triglyceride and/or medium chain triglyceride mixture. In various embodiments, the medium chain triglyceride mixture is substantially free of and/or essentially free of fatty acids having 12 carbon atoms or greater and comprises at least one of capric acid, caprylic acid, and various mixtures of the same, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, a hydrophobic herbal extract from 0.01% to 15% by weight of the total oral care composition, a hydrophobic vitamin from 0.01% to 5% by weight of the total oral care composition.

Various oral care compositions may comprise: from about 10% to about 99% by weight medium chain triglyceride and/or medium chain triglyceride mixture. In various embodiments, the medium chain triglyceride mixture comprises and/or consists essentially of capric acid, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, a hydrophobic herbal extract from 0.01% to 15% by weight of the total oral care composition, a hydrophobic vitamin from 0.01% to 5% by weight of the total oral care composition.

Various oral care compositions may comprise: from about 10% to about 99% by weight medium chain triglyceride and/or medium chain triglyceride mixture. In various embodiments, the medium chain triglyceride mixture comprises and/or consists essentially of caprylic acid, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, a hydrophobic herbal extract from 0.01% to 15% by weight of the total oral care composition, a hydrophobic vitamin from 0.01% to 5% by weight of the total oral care composition.

Various oral care compositions may comprise: from about 10% to about 99% by weight medium chain triglyceride and/or medium chain triglyceride mixture. In various embodiments, the medium chain triglyceride mixture comprises and/or consists essentially of caproic acid, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, a hydrophobic herbal extract from 0.01% to 15% by weight of the total oral care composition, a hydrophobic vitamin from 0.01% to 5% by weight of the total oral care composition.

Various oral care compositions may comprise: from about 10% to about 99% by weight medium chain triglyceride and/or medium chain triglyceride mixture. In various embodiments, the medium chain triglyceride mixture comprises and/or consists essentially of caproic acid and lauric acid, a flavoring agent from 0.01% to 15% by weight of the total oral care composition, a sweetening agent from 0.01% to 5% by weight of the total oral care composition, a hydrophobic anti-microbial agent from 0.01% to 15% by weight of the total oral care composition, a hydrophobic herbal extract from 0.01% to 15% by weight of the total oral care composition, a hydrophobic vitamin from 0.01% to 5% by weight of the total oral care composition.

Various oral care compositions may comprise: from about 96% to about 97% by weight medium chain triglyceride mixture comprising fractionated coconut oil that is substantially free of and/or essentially free of fatty acids having 12 carbon atoms or greater. Stated another way, in various embodiments, the medium chain triglyceride mixture is substantially free of and/or essentially free of fatty acids having 12 carbon atoms or greater and comprises at least one of capric acid, caprylic acid, and various mixtures of the same, stevia from 0.01% to 0.1% by weight of the total oral care composition, clove oil from 0.1% to 0.2% by weight of the total oral care composition, tea tree oil from 0.1% to 0.2% by weight of the total oral care composition, cardamom oil from 0.1% to 0.2% by weight of the total oral care composition, oregano oil from 0.04% to 0.06% by weight of the total oral care composition, hydrophobic extract of ashwagandha from 0.1% to 0.3% by weight of the total oral care composition, hydrophobic extract of turmeric from 0.01% to 0.2% by weight of the total oral care composition, hydrophobic extract of neem from 0.0001% to 0.002% by weight of the total oral care composition, hydrophobic extract of roman chamomile from 0.09% to 0.1% by weight of the total oral care composition, hydrophobic extract of cinnamon bark from 1% to 3% by weight of the total oral care composition, vitamin D3 from 0.001% to 0.003% by weight of the total oral care composition, vitamin K2 oil from 0.0001% to 0.005% by weight of the total oral care composition and vitamin E oil from 0.05% to 0.1% by weight of the total oral care composition.

Various oral care compositions may comprise: from about 96% to about 97% by weight medium chain triglyceride mixture. Stated another way, in various embodiments, the medium chain triglyceride the medium chain triglyceride mixture comprises and/or consists essentially of capric acid, stevia from 0.01% to 0.1% by weight of the total oral care composition, clove oil from 0.1% to 0.2% by weight of the total oral care composition, tea tree oil from 0.1% to 0.2% by weight of the total oral care composition, cardamom oil from 0.1% to 0.2% by weight of the total oral care composition, oregano oil from 0.04% to 0.06% by weight of the total oral care composition, hydrophobic extract of ashwagandha from 0.1% to 0.3% by weight of the total oral care composition, hydrophobic extract of turmeric from 0.01% to 0.2% by weight of the total oral care composition, hydrophobic extract of neem from 0.0001% to 0.002% by weight of the total oral care composition, hydrophobic extract of roman chamomile from 0.09% to 0.1% by weight of the total oral care composition, hydrophobic extract of cinnamon bark from 1% to 3% by weight of the total oral care composition, vitamin D3 from 0.001% to 0.003% by weight of the total oral care composition, vitamin K2 oil from 0.0001% to 0.005% by weight of the total oral care composition and vitamin E oil from 0.05% to 0.1% by weight of the total oral care composition.

Various oral care compositions may comprise: from about 96% to about 97% by weight medium chain triglyceride mixture. Stated another way, in various embodiments, the medium chain triglyceride the medium chain triglyceride mixture comprises and/or consists essentially of caprylic acid, stevia from 0.01% to 0.1% by weight of the total oral care composition, clove oil from 0.1% to 0.2% by weight of the total oral care composition, tea tree oil from 0.1% to 0.2% by weight of the total oral care composition, cardamom oil from 0.1% to 0.2% by weight of the total oral care composition, oregano oil from 0.04% to 0.06% by weight of the total oral care composition, hydrophobic extract of ashwagandha from 0.1% to 0.3% by weight of the total oral care composition, hydrophobic extract of turmeric from 0.01% to 0.2% by weight of the total oral care composition, hydrophobic extract of neem from 0.0001% to 0.002% by weight of the total oral care composition, hydrophobic extract of roman chamomile from 0.09% to 0.1% by weight of the total oral care composition, hydrophobic extract of cinnamon bark from 1% to 3% by weight of the total oral care composition, vitamin D3 from 0.001% to 0.003% by weight of the total oral care composition, vitamin K2 oil from 0.0001% to 0.005% by weight of the total oral care composition and vitamin E oil from 0.05% to 0.1% by weight of the total oral care composition.

Various oral care compositions may comprise: from about 96% to about 97% by weight medium chain triglyceride mixture. Stated another way, in various embodiments, the medium chain triglyceride the medium chain triglyceride mixture comprises and/or consists essentially of caproic acid, stevia from 0.01% to 0.1% by weight of the total oral care composition, clove oil from 0.1% to 0.2% by weight of the total oral care composition, tea tree oil from 0.1% to 0.2% by weight of the total oral care composition, cardamom oil from 0.1% to 0.2% by weight of the total oral care composition, oregano oil from 0.04% to 0.06% by weight of the total oral care composition, hydrophobic extract of ashwagandha from 0.1% to 0.3% by weight of the total oral care composition, hydrophobic extract of turmeric from 0.01% to 0.2% by weight of the total oral care composition, hydrophobic extract of neem from 0.0001% to 0.002% by weight of the total oral care composition, hydrophobic extract of roman chamomile from 0.09% to 0.1% by weight of the total oral care composition, hydrophobic extract of cinnamon bark from 1% to 3% by weight of the total oral care composition, vitamin D3 from 0.001% to 0.003% by weight of the total oral care composition, vitamin K2 oil from 0.0001% to 0.005% by weight of the total oral care composition and vitamin E oil from 0.05% to 0.1% by weight of the total oral care composition.

Various oral care compositions may comprise: from about 96% to about 97% by weight medium chain triglyceride mixture. Stated another way, in various embodiments, the medium chain triglyceride the medium chain triglyceride mixture comprises and/or consists essentially of caproic acid and lauric acid, stevia from 0.01% to 0.1% by weight of the total oral care composition, clove oil from 0.1% to 0.2% by weight of the total oral care composition, tea tree oil from 0.1% to 0.2% by weight of the total oral care composition, cardamom oil from 0.1% to 0.2% by weight of the total oral care composition, oregano oil from 0.04% to 0.06% by weight of the total oral care composition, hydrophobic extract of ashwagandha from 0.1% to 0.3% by weight of the total oral care composition, hydrophobic extract of turmeric from 0.01% to 0.2% by weight of the total oral care composition, hydrophobic extract of neem from 0.0001% to 0.002% by weight of the total oral care composition, hydrophobic extract of roman chamomile from 0.09% to 0.1% by weight of the total oral care composition, hydrophobic extract of cinnamon bark from 1% to 3% by weight of the total oral care composition, vitamin D3 from 0.001% to 0.003% by weight of the total oral care composition, vitamin K2 oil from 0.0001% to 0.005% by weight of the total oral care composition and vitamin E oil from 0.05% to 0.1% by weight of the total oral care composition.

Methods for Preparing Exemplary Compositions

With reference to FIG. 1, a method 100 of preparing an oil pulling oil is shown. A medium chain triglyceride mixture that is substantially free of and/or essentially free of fatty acids having 12 carbon atoms or greater and comprises at least one of capric acid, caprylic acid, and various mixtures of the same is combined with a hydrophobic anti-microbial agent in step 102 to obtain a mixture. In step 104, a hydrophobic flavoring agent is added to the mixture to obtain a flavored mixture. In step 106, a hydrophobic herbal extract is added to the flavored mixture.

Example 1: Formulations of Oil Pulling Oil Embodiments

Various compositions of Exemplary Composition I were formulated and tested below. Oil Pulling oil compositions and ingredients thereof tested (Oils A through H) are summarized in Table 1. Oil pulling oil is a formulation in a single phase liquid form intended to be agitated in the oral cavity for between 2 minutes and 10 minutes and then expelled from the oral cavity.

TABLE 1

Oil Pulling Oil

| Ingredient | Oil A | Oil B | Oil C | Oil D | Oil E | Oil F | Oil G | Oil H |
|---|---|---|---|---|---|---|---|---|
| MCT mixture | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater |
| hydrophobic anti-microbial agent | Oregano oil, tea tree oil, clove oil | Oregano oil | tea tree oil | clove oil | Oregano oil, tea tree oil, | tea tree oil, clove oil | Oregano oil, tea tree oil, eugenol | Oregano oil, tea tree oil, clove oil |
| hydrophobic flavoring agent | Peppermint oil, spearmint oil, cardamom oil | Peppermint oil, | spearmint oil, | cardamom oil | Peppermint oil, spearmint oil, | Peppermint oil, cardamom oil | Peppermint oil, spearmint oil, cardamom oil | Peppermint oil, cardamom oil |
| salivary stimulating agent | Fennel oil | Fennel oil | Fennel oil | Fennel oil | Fennel oil | Fennel oil | Fennel oil | Fennel oil |
| Vitamins | Vitamin E, vitamin D3, vitamin K2 | Vitamin E, | vitamin D3, | vitamin K2 | Vitamin E, vitamin D3, | Vitamin E, vitamin K2 | Vitamin E, vitamin D3, vitamin K2 | vitamin D3, vitamin K2 |
| Sweetener | Stevia | Stevia | Stevia | Stevia | Stevia | Stevia | Stevia | Stevia |

TABLE 2

Oil Pulling Oil

| Ingredient | Oil I | Oil J | Oil K | Oil L | Oil M | Oil N | Oil O | Oil P |
|---|---|---|---|---|---|---|---|---|
| MCT mixture | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms |
| hydrophobic anti-microbial agent | Oregano oil, tea tree oil, clove oil | Oregano oil | tea tree oil | clove oil | Oregano oil, tea tree oil, | tea tree oil, clove oil | Oregano oil, tea tree oil, eugenol | Oregano oil, tea tree oil, clove oil |
| hydrophobic flavoring agent | Peppermint oil, spearmint oil, cardamom oil | Peppermint oil, | spearmint oil, | cardamom oil | Peppermint oil, spearmint oil, | Peppermint oil, cardamom oil | Peppermint oil, spearmint oil, cardamom oil | Peppermint oil, cardamom oil |
| salivary stimulating agent | Fennel oil | Fennel oil | Fennel oil | Fennel oil | Fennel oil | Fennel oil | Fennel oil | Fennel oil |
| Vitamins | Vitamin E, vitamin D3, vitamin K2 | Vitamin E, | vitamin D3, | vitamin K2 | Vitamin E, vitamin D3, | Vitamin E, vitamin K2 | Vitamin E, vitamin D3, vitamin K2 | vitamin D3, vitamin K2 |
| Sweetener | Stevia | Stevia | Stevia | Stevia | Stevia | Stevia | Stevia | Stevia |

TABLE 3

Oil Pulling Oil

| Ingredient | Oil Q | Oil R | Oil S | Oil T | Oil U | Oil V | Oil W | Oil X |
|---|---|---|---|---|---|---|---|---|
| MCT mixture | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater |
| Functional agent | Oregano oil, tea tree oil, clove oil | Fennel oil | Peppermint oil, spearmint oil, cardamom oil | Vitamin E, vitamin D3, vitamin K2 | Oregano oil, tea tree oil, clove oil | Fennel oil | Peppermint oil, spearmint oil, cardamom oil | Vitamin E, vitamin D3, vitamin K2 |

TABLE 4

Oil Pulling Oil

| Ingredient | Oil AA | Oil BB | Oil CC | Oil DD | Oil EE | Oil FF | Oil GG | Oil HH |
|---|---|---|---|---|---|---|---|---|
| MCT mixture | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater | fractionated coconut oil that is substantially free of and/or essentially free of fatty acids having 12 carbon atoms or greater |
| hydrophobic anti-microbial agent | Oregano oil, tea tree oil, clove oil | Oregano oil | tea tree oil | clove oil | Oregano oil, tea tree oil, | tea tree oil, clove oil | Oregano oil, tea tree oil, eugenol | Oregano oil, tea tree oil, clove oil |
| hydrophobic flavoring agent | cardamom oil, cinnamon bark oil | cardamom oil, cinnamon bark oil | cardamom oil, cinnamon bark oil | cardamom oil, cinnamon bark oil | cardamom oil, cinnamon bark oil | cardamom oil, cinnamon bark oil | cardamom oil, cinnamon bark oil | cardamom oil, cinnamon bark oil |
| Hydrophobic herbal extract | Ashwagandha extract, neem extract, turmeric extract, roman chamomile extract | Ashwagandha extract, neem extract, turmeric extract | Ashwagandha extract, turmeric extract, roman chamomile extract | Ashwagandha extract, neem extract, roman chamomile extract | neem extract, turmeric extract, roman chamomile extract | Ashwagandha extract, turmeric extract, | Ashwagandha extract, neem extract, | neem extract, turmeric extract |
| Vitamins | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 |
| Sweetener | Stevia | Stevia | Stevia | Stevia | Stevia | Stevia | Stevia | Stevia |

TABLE 5

Oil Pulling Oil

| Ingredient | Oil AAA | Oil ABB | Oil CCC | Oil DDD | Oil EEE | Oil FFF | Oil GGG | Oil HHH |
| --- | --- | --- | --- | --- | --- | --- | --- | --- |
| MCT mixture | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms | fractionated coconut oil that is substantially free of and/or essentially free of fatty acids having greater than 12 carbon atoms |
| hydrophobic anti-microbial agent | Oregano oil, tea tree oil, clove oil | Oregano oil | tea tree oil | clove oil | Oregano oil, tea tree oil, | tea tree oil, clove oil | Oregano oil, tea tree oil, eugenol | Oregano oil, tea tree oil, clove oil |
| hydrophobic flavoring agent | cardamom oil, cinnamon bark oil | cardamom oil, cinnamon bark oil | cardamom oil, cinnamon bark oil | cardamom oil, cinnamon bark oil | cardamom oil, cinnamon bark oil | cardamom oil, cinnamon bark oil | cardamom oil, cinnamon bark oil | cardamom oil, cinnamon bark oil |
| Hydrophobic herbal extract | Ashwagandha extract, neem extract, turmeric extract, roman chamomile extract | Ashwagandha extract, neem extract, turmeric extract | Ashwagandha extract, turmeric extract, roman chamomile extract | Ashwagandha extract, neem extract, roman chamomile extract | neem extract, turmeric extract, roman chamomile extract | Ashwagandha extract, turmeric extract, | Ashwagandha extract, neem extract, | neem extract, turmeric extract |
| Vitamins | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 | Vitamin E, vitamin D3, vitamin K2 |
| Sweetener | Stevia | Stevia | Stevia | Stevia | Stevia | Stevia | Stevia | Stevia |

For the avoidance of doubt, the hydrophobic herbal extracts listed in TABLE 4 and TABLE 5 may comprise supercritical carbon dioxide extracted oils, extracts made using organic solvents, and/or combinations of the same. In various embodiments, only supercritical carbon dioxide extracted oils are used. An exemplary formulation of oil AA is below in TABLE 6.

TABLE 6

| Ingredients | % w/w |
| --- | --- |
| MCT Oil (C8-C10) | 96-97 |
| Cinnamon Bark Oil | 1-3 |
| Ashwagandha Extract | 0.1-0.3 |
| Neem Extract | 0.001-0.002 |
| Turmeric Extract | 0.01-0.2 |
| Stevia Leaf Extract | 0.01-0.1 |
| Cardamom Oil | 0.1-0.2 |
| Roman Chamomile Oil | 0.09-0.1 |
| Clove Oil | 0.1-0.2 |
| Tea Tree Oil | 0.1-0.2 |
| Oregano Oil | 0.04-0.06 |
| Vitamin E | 0.05-0.1 |
| Vitamin D3 | 0.001-0.003 |
| Vitamin K2 | 0.0001-0.0002 |

Further example embodiments are below in TABLE 7.

TABLE 7

| Ingredients | Example Range |
| --- | --- |
| MCT Oil (C8-C10) | 10-99 |
| Cinnamon Bark Oil | 0-10 |
| Ashwagandha Extract | 0-5 |
| Neem Extract | 0-5 |
| Turmeric Extract | 0-5 |
| Stevia Leaf Extract | 0-5 |
| Cardamom Oil | 0-15 |
| Roman Chamomile Oil | 0-10 |
| Clove Oil | 0-15 |
| Tea Tree Oil | 0-15 |
| Oregano Oil | 0-15 |
| Vitamin E | 0-5 |
| Vitamin D3 | 0-1 |
| Vitamin K2 | 0-1 |
| Total | |

Further example embodiments are below in TABLE 8.

TABLE 8

| Ingredients | Example Range |
| --- | --- |
| MCT Oil (C8-C10) | 50-99 |
| Cinnamon Bark Oil | 0.01-10 |
| Ashwagandha Extract | 0.01-5 |
| Neem Extract | 0.01-5 |
| Turmeric Extract | 0.01-5 |

TABLE 8-continued

| Ingredients | Example Range |
|---|---|
| Stevia Leaf Extract | 0.01-5 |
| Cardamom Oil | 0.01-15 |
| Roman Chamomile Oil | 0.01-10 |
| Clove Oil | 0.01-15 |
| Tea Tree Oil | 0.01-15 |
| Oregano Oil | 0.01-15 |
| Vitamin E | 0.01-5 |
| Vitamin D3 | 0.01-1 |
| Vitamin K2 | 0.01-1 |
| Total | |

Example 2: Anti-Microbial Features

A study was performed to understand the anti-microbial properties of Oil A from TABLE 1. Oil A was used to treat bacteria relative to a placebo and a commercially available aqueous mouthwash containing ethanol. Tests were performed against gram positive and gram negative bacteria. Moreover, tests were performed relative to plaque reduction and modified gingival score. The results are listed in FIGS. 2 and 3.

Example 3: Malodor Effectiveness

A study was performed to understand the anti-malodor properties of Oil A from TABLE 1.

A randomized, double-blinded clinical trial was conducted. Sixty (60) adult volunteers, men and women, with oral malodor of at least 7.0±0.5 on a hedonic scale were enrolled. At baseline, a hedonic breath evaluation was conducted by three blinded and calibrated organoleptic judges. Sixty subjects (30/Group A and 30/Group B) that meet the continuance criteria were randomly assigned. The subjects were asked to refrain from the intake of alcohol, foods containing sulfur compounds such as garlic or onion, scented cosmetics, smoking or using any tobacco products 12 hours prior to the visit, medicated lozenges, mints, sweets or gum that contain antimicrobial agents, including but not limited to, Xylitol, Essential Oils, Cetylpyndinium chloride, Chlorine Dioxide and Zinc 24 hours prior to the visit, antibiotics, any other mouthwash.

A baseline malodor scale was taken at the initial visit. The subjects were instructed to use the mouthwash of oil A by agitating 10 mL the mouthwash in the oral cavity for two minutes. Malodor was again measured 12 hours after the use of the mouthwash. Subjects then used the mouthwash once per day by agitating the mouthwash in the oral cavity for two minutes over the course of three weeks. Malodor was then measured again for all subjects. All 60 subject completed the study.

The results are shown in FIGS. 2 and 3. The active group (Group B) showed significant reduction in oral malodor as compared to placebo group (Group A).

Example 4: Whitening Study

Thirty healthy volunteers were enrolled in a single-arm study. Study volunteers, men and women, with yellow teeth were enrolled. The subjects were evaluated for tooth shade change and oral examination at baseline and at 6-week visit.

Prior to evaluation with classic Vita shade guide the subjects were instructed to perform regular oral hygiene. Tooth color as recorded via Vita shade guide for the facial surface of the maxillary anterior four teeth. Subjects were reminded to use the oral hygiene product (Oil A from TABLE 1) distributed at the baseline visit. The study spanned six weeks and included a baseline visit as well as a visit at the end of the six-week period.

The subjects who were invited to participate for the baseline visit were instructed to refrain from the following: intake of coffee, tea, stained foods, antibiotics, any teeth whitening product, any other mouthwash for six weeks.

Assessment of the oral soft tissue as conducted by a licensed California dentist via a visual examination of the oral cavity and perioral area utilizing a standard dental light, dental mirror, and gauze. The structures examined included the gingiva (free and attached), hard and soft palate, oropharynx/uvula, buccal mucosa, tongue, floor of the mouth, labial mucosa, mucobuccal/mucolabial folds, lips, and perioral area. Assessment of the oral hard tissues was conducted via a visual examination of the dentition and restorations utilizing a standard dental light, dental mirror, and air syringe.

Figure 4:
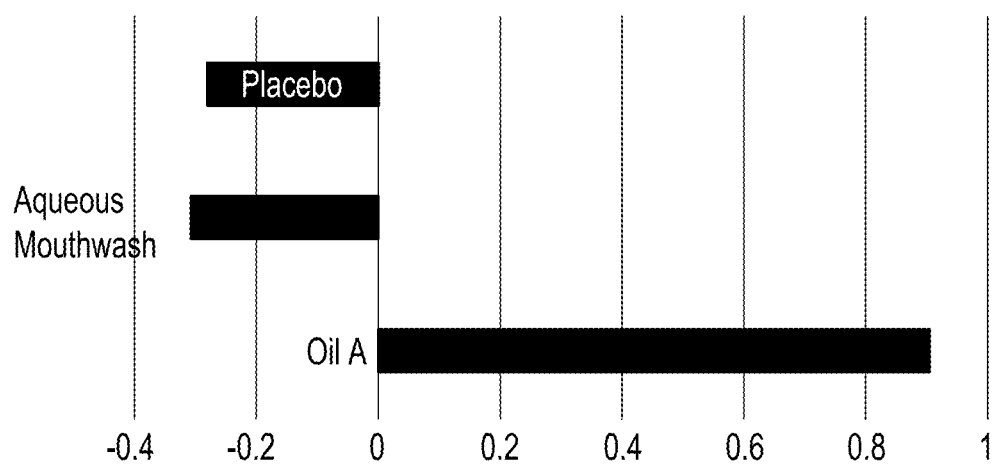
FIG. 4 illustrates tooth whitening of an oral care composition according to various embodiments.
Figure 5:
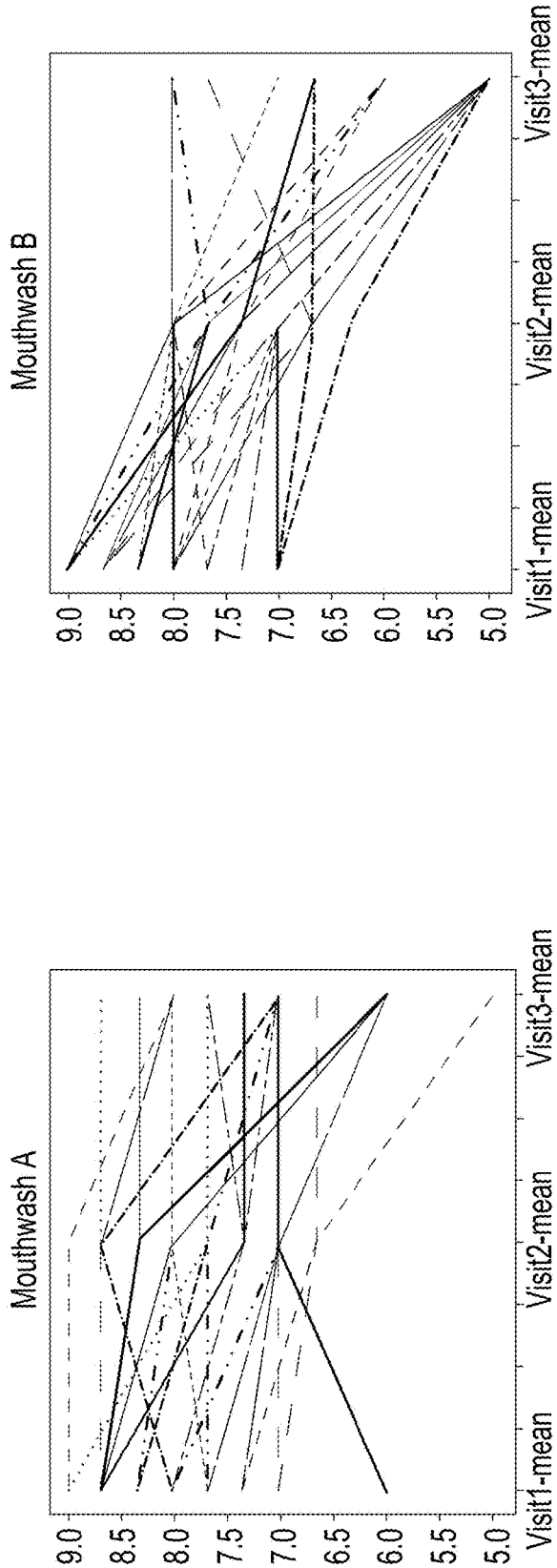

All subjects had A1 or darker teeth on the Vita scale. The subjects were instructed to use 10 mL the mouthwash of Oil A in TABLE 1 by agitating the mouthwash in the oral cavity for two minutes once daily. Subjects returned six weeks later and were examined. The average tooth shade change for the sample was 2.6. See FIGS. 4 and 7 for further data.

The detailed description shows embodiments by way of illustration, including the best mode. While these embodiments are described in sufficient detail to enable those skilled in the art to practice the principles of the present disclosure, it should be understood that other embodiments may be realized and that chemical changes may be made without departing from the spirit and scope of principles of the present disclosure. Thus, the detailed description herein is presented for purposes of illustration only and not of limitation. With regard to procedures, methods, techniques, and workflows that are in accordance with some embodiments, some operations in the procedures, methods, techniques, and workflows disclosed herein may be combined and/or the order of some operations may be changed. For example, the steps recited in any of the method descriptions may be executed in any suitable order and are not limited to the order presented.

In the above description, all cited references are incorporated herein by reference in their entireties. The citing of any reference is not an admission that such a reference is relevant prior art; rather, citations are to reference the novelty of the invention and discoveries described herein relative to known scientific literature, practices and prior art. In the description of the present disclosure, all ratios are weight ratios unless specifically stated otherwise. Unless otherwise indicated or evident from context, preferences indicated above and herein apply to the entirety of the embodiments discussed herein.

In describing the present disclosure, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc.

This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

The scope should be determined by the appended claims and their legal equivalents, rather than by the examples given above. For example, the operations recited in any method claims may be executed in any order and are not limited to the order presented in the claims. Moreover, no element is essential unless specifically described herein as "critical" or "essential."

Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The invention claimed is:

1. A hydrophobic oral formulation, comprising:
   (i) a mixture of triglycerides having 8 carbon atoms or 10 carbon atoms present in an amount of at least 96% by weight of the formulation,
      wherein the triglyceride mixture comprises about 40% to about 60% triglycerides having 8 carbon atoms,
      wherein the mixture of medium chain triglycerides is substantially free of fatty acids having 12 carbon atoms or greater;
   (ii) one or more oil soluble plant extracts present in an amount ranging from 0.001% to 5% by weight of the formulation selected from ashwagandha extract, neem extract, turmeric extract, and combinations thereof;
   (iii) one or more plant-derived anti-microbial oils present in an amount ranging from 0.04% to 15% by weight of the formulation selected from oregano oil, tea tree oil, clove oil, cinnamon bark oil, and combinations thereof; and
   (iv) one or more vitamins present in an amount ranging from 0.0001% to 5% by weight of the formulation selected from vitamin E, vitamin A, beta carotene, vitamin D2, vitamin D3, vitamin D4, vitamin D5, vitamin K1, vitamin K2, and combinations thereof,
   wherein each of the ingredients of (ii), (iii), and (iv) are soluble in the mixture of triglycerides of (i), improving penetration of the formulation through oral biofilm and enhancing delivery of the ingredients of (ii), (iii), and (iv).

2. The hydrophobic oral formulation of claim 1, further comprising one or more of stevia leaf extract, cardamom oil, and Roman Chamomile oil.

3. The hydrophobic oral formulation of claim 1, wherein the viscosity of the hydrophobic oral formulation ranges from 0 Centipoise to 40 Centipoise.

4. The hydrophobic oral formulation of claim 1, wherein the hydrophobic oral formulation is configured to, upon use in the oral cavity by a user: (i) reduce gram-positive bacteria, (ii) reduce gram-negative bacteria, (iii) reduce a modified gingival score, (iv) reduce a plaque index, and/or (v) improve a VITA shade scale.

5. The hydrophobic oral formulation of claim 1, wherein:
   the one or more oil soluble plant extracts comprises ashwagandha extract, neem extract, and turmeric extract,
   the one or more plant-derived anti-microbial oils comprises oregano oil, tea tree oil, clove oil, and cinnamon bark oil,
   the one or more vitamins comprises vitamin E, vitamin D2, and vitamin K2.

6. A hydrophobic oral formulation, consisting essentially of:
   (i) a mixture of medium chain triglycerides present in an amount of at least 96% by weight of the formulation,
      wherein the mixture of medium chain triglycerides comprises capric acid and caprylic acid wherein the mixture of medium chain triglycerides comprises about 40% to about 60% triglycerides having 8 carbon atoms and up to about 60% having 10 carbon atoms,
      wherein the mixture of medium chain triglycerides is substantially free of fatty acids having 12 carbon atoms or greater;
   (ii) a plurality of oil soluble plant extracts, comprising:
      a first oil soluble plant extract present in an amount between 0.1% and 0.3% by weight of the formulation,
         wherein the first oil soluble plant extract comprises ashwagandha extract;
      a second oil soluble plant extract present in an amount between 0.0001% and 0.002% by weight of the formulation,
         wherein the second oil soluble plant extract comprises neem extract;
      a third oil soluble plant extract present in an amount between 0.01% and 0.2% by weight of the formulation,
         wherein the third oil soluble plant extract comprises turmeric extract;

(iii) a plurality of oil soluble plant-derived anti-microbial oils, comprising:
   a first oil soluble plant-derived anti-microbial oil present in an amount between 0.04% and 0.06% by weight of the formulation,
      wherein the first oil soluble plant-derived anti-microbial oil comprises oregano oil;
   a second oil soluble plant-derived anti-microbial oil present in an amount between 0.1% and 0.2% by weight of the formulation,
      wherein the second oil soluble plant-derived anti-microbial oil comprises tea tree oil;
   a third oil soluble plant-derived anti-microbial oil present in an amount between 0.1% and 0.2% by weight of the formulation,
      wherein the third oil soluble plant-derived anti-microbial oil comprises clove oil;
   a fourth oil soluble plant-derived anti-microbial oil present in an amount between 1% and 3% by weight of the formulation,
      wherein the fourth oil soluble plant-derived anti-microbial oil comprises cinnamon bark oil; and
(iv) a plurality of oil soluble vitamins, comprising:
   a first oil soluble vitamin present in an amount between 0.05% and 0.1% by weight of the formulation,
      wherein the first oil soluble vitamin comprises vitamin E;
   a second oil soluble vitamin present in an amount between 0.001% and 0.003% by weight of the formulation,
      wherein the second oil soluble vitamin comprises vitamin D3;
   a third oil soluble vitamin present in an amount up to 0.0002% by weight of the formulation,
      wherein the third oil soluble vitamin comprises vitamin K2;
(v) a plurality of flavoring agents, comprising:
   a first flavoring agent present in an amount between 0.1% and 0.2% by weight of the formulation,
      wherein the first flavoring agent comprises cardamom oil;
   a second flavoring agent present in an amount between 0.09% and 0.1% by weight of the formulation,
      wherein the second flavoring agent comprises Roman chamomile oil;
(vi) at least one sweetening agent, comprising:
   a first sweetening agent present in an amount between 0.01% and 0.1% by weight of the formulation,
      wherein the first sweetener comprises stevia leaf extract;
wherein the hydrophobic oral formulation is configured to reduce one or both of gram-positive and gram-negative bacteria in the oral cavity of a user,
wherein the oil soluble ingredients are soluble in the mixture of medium chain triglycerides, improving penetration of the formulation through oral biofilm and enhancing delivery of the ingredients, and
wherein the hydrophobic oral formulation is substantially free of water.

7. The hydrophobic oral formulation claim 6, wherein the ashwagandha extract, neem extract, and turmeric extract respectively comprise supercritical carbon dioxide extracted ashwagandha extract, supercritical carbon dioxide extracted neem extract, and supercritical carbon dioxide extracted turmeric extract.

8. The hydrophobic oral formulation claim 6, wherein the mixture of medium chain triglycerides is derived from fractionated coconut oil.

9. The hydrophobic oral formulation claim 6, wherein the mixture of medium chain triglycerides further comprises caproic acid.

10. A hydrophobic oral formulation, comprising:
   a mixture of triglycerides having 8 carbon atoms or 10 carbon atoms present in an amount between 10% and 99% by weight of the formulation, wherein the mixture of triglycerides comprises about 40% to about 60% triglycerides having 8 carbon atoms and wherein each of the following ingredients are soluble in the mixture of triglycerides:
   ashwagandha extract present in an amount between 0.1% and 5% by weight of the formulation;
   neem extract present in an amount between 0.001% and 5% by weight of the formulation;
   turmeric extract present in an amount between 0.01% and 5% by weight of the formulation;
   oregano oil present in an amount between 0.01% and 15% by weight of the formulation;
   tea tree oil present in an amount between 0.01% and 0.2% by weight of the formulation;
   clove oil present in an amount between 0.01% and 15% by weight of the formulation;
   vitamin E present in an amount between 0.01% and 15% by weight of the formulation;
   vitamin D3 present in an amount between 0.001% and 1% by weight of the formulation; and
   vitamin K2 present in an amount between 0.0001% and 0.0002% by weight of the formulation.

11. The hydrophobic oral formulation of claim 10, further comprising:
   cardamom oil present in an amount between 0.01% and 15% by weight of the formulation;
   Roman chamomile oil present in an amount between 0.09% and 0.1% by weight of the formulation;
   Cinnamon bark oil present in an amount between 1% and 3% by weight of the formulation; and
   stevia leaf extract present in an amount between 0.01% and 5% by weight of the formulation.

12. The hydrophobic oral formulation of claim 10, wherein the hydrophobic oral formulation is configured to, upon use in the oral cavity by a user: (i) reduce gram-positive bacteria, (ii) reduce gram-negative bacteria, (iii) reduce a modified gingival score, (iv) reduce a plaque index, and/or (v) improve a VITA shade scale.

13. The hydrophobic oral formulation of claim 10, wherein at least one of the ashwagandha extract, neem extract, and turmeric extract are supercritical carbon dioxide extracted.

14. The hydrophobic oral formulation of claim 10, wherein the cloud point of the hydrophobic oral formulation is less than −5 degrees Celsius.

15. The hydrophobic oral formulation of claim 10, wherein the viscosity of the hydrophobic oral formulation ranges from 0 Centipoise to 40 Centipoise.

* * * * *